US012378061B2

(12) United States Patent
Vu

(10) Patent No.: US 12,378,061 B2
(45) Date of Patent: Aug. 5, 2025

(54) APPARATUS AND PRODUCTS FOR PRODUCING BEVERAGES, AND METHODS FOR MAKING AND USING SAME

(71) Applicant: Universal Coffee LLC, La Mirada, CA (US)

(72) Inventor: Robert Bao Vu, Houston, TX (US)

(73) Assignee: Universal Coffee LLC, La Mirada, CA (US)

(*) Notice: Subject to any disclaimer, the term of this patent is extended or adjusted under 35 U.S.C. 154(b) by 311 days.

(21) Appl. No.: 16/378,495

(22) Filed: Apr. 8, 2019

(65) Prior Publication Data
US 2020/0102144 A1 Apr. 2, 2020

Related U.S. Application Data

(63) Continuation of application No. 16/127,186, filed on Sep. 10, 2018, now Pat. No. 10,252,854.

(51) Int. Cl.
B65D 85/804 (2006.01)
A47J 31/06 (2006.01)

(52) U.S. Cl.
CPC ...... *B65D 85/8061* (2020.05); *A47J 31/0689* (2013.01); *B65D 85/8052* (2020.05)

(58) Field of Classification Search
CPC .......................... B65D 85/8043; A47J 31/0689
See application file for complete search history.

(56) References Cited

U.S. PATENT DOCUMENTS

| 1,377,316 | A | 5/1921 | Clermont |
| 1,743,925 | A | 1/1930 | Krause |
| 1,871,590 | A | 8/1932 | D'Annunzio et al. |
| 2,234,397 | A | 3/1941 | Bentz |
| 2,242,684 | A | 5/1941 | Stuart |
| 2,407,118 | A | 9/1946 | Waters |
| 2,433,815 | A | 12/1947 | Laforge |
| 2,443,520 | A | 6/1948 | Schwartz et al. |
| 2,546,874 | A | 3/1951 | Siegrist |
| 2,968,560 | A | 1/1961 | Goros |
| 3,022,411 | A | 2/1962 | Soper et al. |
| 3,047,127 | A | 7/1962 | Mcgow |
| 3,115,822 | A | 12/1963 | Totten |
| 3,119,682 | A | 1/1964 | Martin |
| 3,120,170 | A | 2/1964 | Garte |
| 3,136,241 | A | 6/1964 | Price |
| 3,199,682 | A | 8/1965 | Scholtz |

(Continued)

FOREIGN PATENT DOCUMENTS

| AU | 2013285525 B2 | 12/2014 |
| CN | 2615077 Y | 5/2004 |

(Continued)

OTHER PUBLICATIONS

PTAB Case IPR2014-00042, Decision, Institution of Inter Partes Review, Feb. 19, 2014.

(Continued)

*Primary Examiner* — Ibrahime A Abraham
*Assistant Examiner* — Kuangyue Chen
(74) *Attorney, Agent, or Firm* — IP Strategies

(57) ABSTRACT

A brewing container for use with brewing machines, the container including a distribution outlet for dispersing the injected water in at least 3 directions away from vertical within the cartridge.

7 Claims, 5 Drawing Sheets

(56) References Cited

U.S. PATENT DOCUMENTS

| | | |
|---|---|---|
| 3,224,360 A | 12/1965 | Wickenberg et al. |
| 3,269,298 A | 8/1966 | Grundmann |
| 3,316,388 A | 4/1967 | Wickenberg et al. |
| 3,326,115 A | 6/1967 | Karlen et al. |
| 3,336,857 A | 8/1967 | Knodt et al. |
| 3,356,011 A | 12/1967 | Parraga |
| 3,384,004 A | 5/1968 | Perlman et al. |
| 3,403,617 A | 10/1968 | Lampe |
| 3,405,630 A | 10/1968 | Weber, III |
| 3,411,431 A | 11/1968 | Moerlini et al. |
| 3,446,624 A | 5/1969 | Luedtke |
| 3,478,670 A | 11/1969 | Fuqua |
| 3,490,356 A * | 1/1970 | Peterson ............ A47J 31/4478 99/300 |
| 3,530,787 A | 9/1970 | Litterio |
| 3,566,772 A | 3/1971 | Oliver et al. |
| 3,583,308 A | 6/1971 | Williams |
| 3,592,126 A | 7/1971 | Dombrowik |
| 3,596,588 A | 8/1971 | Moss |
| 3,599,557 A | 8/1971 | Leal |
| 3,607,297 A | 9/1971 | Fasano |
| 3,615,708 A | 10/1971 | Abile-Gal |
| 3,695,168 A | 10/1972 | Van Brunt |
| 3,713,377 A | 1/1973 | Smith |
| 3,757,670 A | 9/1973 | Grahn |
| 3,812,273 A | 5/1974 | Schmidt |
| 3,824,913 A | 7/1974 | Herman et al. |
| 3,844,206 A | 10/1974 | Weber |
| 3,878,772 A | 4/1975 | Nordskog |
| 3,948,157 A | 4/1976 | Layre |
| 3,958,502 A | 5/1976 | Vitous |
| 4,036,121 A | 7/1977 | Bieri |
| 4,052,318 A | 10/1977 | Krebs |
| 4,086,848 A | 5/1978 | Hahn |
| 4,112,830 A | 9/1978 | Saito |
| 4,136,202 A | 1/1979 | Favre |
| 4,143,590 A | 3/1979 | Kasakoff |
| 4,152,464 A | 5/1979 | Brody et al. |
| 4,164,644 A | 8/1979 | Remsnyder et al. |
| D255,313 S | 6/1980 | Elkerbout |
| 4,221,670 A | 9/1980 | Ziemek |
| 4,253,385 A | 3/1981 | Illy |
| 4,286,515 A | 9/1981 | Baumann |
| 4,300,442 A | 11/1981 | Martin |
| 4,410,550 A | 10/1983 | Gaskill |
| 4,510,853 A | 4/1985 | Takagi |
| 4,550,024 A | 10/1985 | le Granse |
| 4,603,621 A | 8/1986 | Roberts |
| 4,626,435 A | 12/1986 | Zimmerman |
| 4,644,855 A | 2/1987 | Woolman et al. |
| 4,644,856 A | 2/1987 | Borgmann |
| 4,653,390 A | 3/1987 | Hayes |
| 4,656,932 A | 4/1987 | Kopp |
| 4,676,396 A | 6/1987 | Mamolou |
| 4,703,687 A | 11/1987 | Wei |
| 4,704,954 A | 11/1987 | Mollenhoff |
| 4,706,555 A | 11/1987 | Nakamura |
| 4,721,835 A | 1/1988 | Welker |
| 4,735,719 A | 4/1988 | Benedict |
| 4,739,697 A | 4/1988 | Roberts |
| 4,748,901 A | 6/1988 | Burmeister |
| 4,759,274 A | 7/1988 | Schmidt |
| 4,787,299 A | 11/1988 | Levi et al. |
| 4,800,089 A | 1/1989 | Scott |
| 4,832,845 A | 5/1989 | Hendretti |
| 4,833,979 A | 5/1989 | Garulli et al. |
| 4,836,592 A | 6/1989 | Roberts |
| 4,846,052 A | 7/1989 | Favre et al. |
| 4,848,815 A | 7/1989 | Molloy |
| 4,858,523 A | 8/1989 | Helbling |
| 4,865,737 A | 9/1989 | McMichael |
| 4,867,880 A | 9/1989 | Pelle et al. |
| 4,867,993 A | 9/1989 | Nordskog |
| 4,882,982 A | 11/1989 | Muttoni |
| 4,913,916 A | 4/1990 | Tanner |
| 4,920,868 A | 5/1990 | Gehrmann |
| 4,957,217 A | 9/1990 | Ritson |
| 4,967,648 A | 11/1990 | Helbling |
| 4,983,410 A | 1/1991 | Dinos |
| 4,986,172 A | 1/1991 | Hunnicutt, Jr. |
| 4,995,310 A | 2/1991 | van der Lijn et al. |
| 4,998,463 A | 3/1991 | Precht et al. |
| 5,000,082 A | 3/1991 | Lassota |
| 5,012,059 A | 4/1991 | Boatman |
| 5,012,629 A | 5/1991 | Rehman et al. |
| 5,028,328 A | 7/1991 | Long |
| 5,046,409 A | 9/1991 | Henn |
| 5,072,660 A | 12/1991 | Helbling |
| 5,097,984 A | 3/1992 | Meisner et al. |
| 5,108,768 A | 4/1992 | So |
| 5,109,763 A | 5/1992 | Morris |
| 5,120,439 A | 6/1992 | McFarlin |
| 5,123,335 A | 6/1992 | Aselu |
| 5,168,140 A | 12/1992 | Welker |
| 5,171,457 A | 12/1992 | Acuff et al. |
| 5,190,653 A | 3/1993 | Herrick et al. |
| 5,197,374 A | 3/1993 | Fond |
| 5,230,278 A | 7/1993 | Bunn et al. |
| 5,233,914 A | 8/1993 | English |
| 5,242,702 A | 9/1993 | Fond |
| 5,243,164 A | 9/1993 | Erickson et al. |
| 5,265,517 A | 11/1993 | Gilbert |
| 5,267,506 A | 12/1993 | Cai |
| 5,287,797 A | 2/1994 | Grykiewicz et al. |
| 5,298,267 A | 3/1994 | Gruenbacher |
| 5,325,765 A | 7/1994 | Sylvan et al. |
| 5,327,815 A | 7/1994 | Fond et al. |
| 5,335,589 A | 8/1994 | Yerves, Jr. et al. |
| 5,343,799 A | 9/1994 | Fond |
| 5,347,916 A | 9/1994 | Fond et al. |
| 5,363,745 A | 11/1994 | Lin |
| 5,398,595 A | 3/1995 | Fond et al. |
| 5,398,596 A | 3/1995 | Fond |
| 5,401,328 A | 3/1995 | Schmitz |
| 5,402,707 A | 4/1995 | Fond et al. |
| 5,403,605 A | 4/1995 | Smith et al. |
| 5,406,882 A | 4/1995 | Shaanan |
| 5,424,083 A | 6/1995 | Lozito |
| 5,460,078 A | 10/1995 | Weller et al. |
| 5,463,932 A | 11/1995 | Olson |
| 5,472,719 A | 12/1995 | Favre |
| 5,473,973 A | 12/1995 | Cortese |
| 5,490,448 A | 2/1996 | Weller et al. |
| 5,526,733 A | 6/1996 | Klawuhn et al. |
| 5,528,730 A | 6/1996 | Yagi et al. |
| 5,531,152 A | 7/1996 | Gardosi |
| 5,562,941 A | 10/1996 | Levy |
| 5,582,730 A | 12/1996 | Hugentobler |
| 5,582,731 A | 12/1996 | Gianfranco |
| 5,605,710 A | 2/1997 | Pridonoff et al. |
| 5,633,026 A | 5/1997 | Gruenbacher |
| 5,635,233 A | 6/1997 | Levinson |
| 5,636,563 A | 6/1997 | Oppermann et al. |
| 5,649,412 A | 7/1997 | Binacchi |
| 5,649,472 A | 7/1997 | Fond et al. |
| 5,656,311 A | 8/1997 | Fond |
| 5,669,287 A | 9/1997 | Jefferson, Jr. et al. |
| 5,676,041 A | 10/1997 | Glucksman et al. |
| 5,687,637 A | 11/1997 | Brookshire et al. |
| 5,775,205 A | 7/1998 | Melton |
| 5,775,206 A | 7/1998 | St-Gelais |
| 5,829,340 A | 11/1998 | Yang |
| 5,840,189 A | 11/1998 | Sylvan et al. |
| 5,863,431 A | 1/1999 | Salzburg |
| 5,865,094 A | 2/1999 | Kealy |
| 5,865,095 A | 2/1999 | Mulle |
| 5,870,943 A | 2/1999 | Levi et al. |
| 5,875,704 A | 3/1999 | Levi et al. |
| 5,887,508 A | 3/1999 | Estaun |
| 5,887,510 A | 3/1999 | Porter |
| D407,602 S | 4/1999 | Patel |
| 5,895,672 A | 4/1999 | Cooper |
| 5,897,899 A | 4/1999 | Fond |
| 5,906,845 A | 5/1999 | Robertson |

(56) References Cited

U.S. PATENT DOCUMENTS

| | | |
|---|---|---|
| 5,910,205 A | 6/1999 | Patel |
| 5,913,964 A | 6/1999 | Melton |
| 5,924,563 A | 7/1999 | Salyers |
| 5,931,329 A | 8/1999 | Wu |
| 5,932,260 A | 8/1999 | Soughan |
| 6,047,859 A | 4/2000 | Schroeder et al. |
| 6,065,609 A | 5/2000 | Lake |
| 6,079,315 A | 6/2000 | Beaulieu et al. |
| 6,082,247 A | 7/2000 | Beaulicu |
| 6,118,933 A | 9/2000 | Roberson |
| D431,423 S | 10/2000 | Ohm et al. |
| 6,136,352 A | 10/2000 | Silverstein et al. |
| 6,138,551 A | 10/2000 | Bauer et al. |
| 6,142,063 A | 11/2000 | Beaulieu et al. |
| 6,161,470 A | 12/2000 | Justus |
| 6,164,191 A | 12/2000 | Liu et al. |
| 6,182,554 B1 | 2/2001 | Beaulieu et al. |
| 6,189,438 B1 | 2/2001 | Bielfeldt et al. |
| 6,227,102 B1 | 5/2001 | Sham et al. |
| 6,231,909 B1 | 5/2001 | Levinson |
| 6,250,209 B1 | 6/2001 | Pope |
| 6,253,662 B1 | 7/2001 | Zelson |
| 6,263,781 B1 | 7/2001 | Calagui |
| 6,273,293 B1 | 8/2001 | Carlson |
| D452,433 S | 12/2001 | Lazaris |
| D452,434 S | 12/2001 | Sweeney |
| D454,433 S | 3/2002 | Peter |
| D454,434 S | 3/2002 | McDaniel et al. |
| 6,440,256 B1 | 8/2002 | Gordon et al. |
| 6,499,388 B2 | 12/2002 | Schmed |
| 6,510,783 B1 | 1/2003 | Basile et al. |
| 6,517,880 B2 | 2/2003 | Walters, Jr. et al. |
| 6,527,126 B2 | 3/2003 | Hepler |
| 6,555,074 B1 | 4/2003 | Sweet |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,647,862 B1 | 11/2003 | Lin |
| 6,655,260 B2 | 12/2003 | Lazaris et al. |
| 6,658,989 B2 | 12/2003 | Sweeney et al. |
| 6,662,955 B1 | 12/2003 | Lassota |
| 6,666,130 B2 | 12/2003 | Taylor |
| 6,672,200 B2 | 1/2004 | Duffy et al. |
| 6,688,490 B2 | 2/2004 | Carlson |
| 6,708,600 B2 | 3/2004 | Winkler et al. |
| 6,725,763 B2 | 4/2004 | Cai |
| 6,727,484 B2 | 4/2004 | Policappelli |
| 6,740,345 B2 | 5/2004 | Cai |
| 6,748,850 B1 | 6/2004 | Kraan |
| 6,758,130 B2 | 7/2004 | Sargent et al. |
| 6,763,759 B2 | 7/2004 | Denisart |
| 6,777,007 B2 | 8/2004 | Cai |
| 6,786,134 B2 | 9/2004 | Green |
| 6,786,136 B2 | 9/2004 | Cirigliano et al. |
| 6,827,004 B2 | 12/2004 | Hammad et al. |
| 6,832,542 B2 | 12/2004 | Hu et al. |
| 6,843,165 B2 | 1/2005 | Stoner |
| 6,854,378 B2 | 2/2005 | Jarisch et al. |
| D502,362 S | 3/2005 | Lazaris et al. |
| 6,904,840 B1 | 6/2005 | Pfeifer et al. |
| 6,931,984 B2 | 8/2005 | Lassota |
| 6,948,420 B2 | 9/2005 | Kirschner et al. |
| 6,948,421 B2 | 9/2005 | Meador |
| 6,955,116 B2 | 10/2005 | Hale |
| 6,968,775 B2 | 11/2005 | Burrows et al. |
| 6,990,891 B2 | 1/2006 | Tebo, Jr. |
| 6,994,015 B2 | 2/2006 | Bruinsma |
| 7,013,795 B2 | 3/2006 | Mulle et al. |
| 7,032,503 B2 | 4/2006 | Cai |
| 7,032,507 B2 | 4/2006 | Cai |
| 7,047,870 B2 | 5/2006 | Gantt et al. |
| 7,059,239 B2 | 6/2006 | Balkau |
| 7,063,238 B2 | 6/2006 | Hale |
| 7,081,263 B2 | 7/2006 | Albrecht |
| 7,093,533 B2 | 8/2006 | Tebo, Jr. et al. |
| 7,131,369 B2 | 11/2006 | Gantt et al. |
| 7,165,488 B2 | 1/2007 | Bragg et al. |
| D541,587 S | 5/2007 | Pezij |
| 7,279,188 B2 | 10/2007 | Arrick et al. |
| 7,284,679 B2 | 10/2007 | Zill et al. |
| 7,318,374 B2 | 1/2008 | Guerrero |
| 7,320,274 B2 | 1/2008 | Castellani |
| 7,328,651 B2 | 2/2008 | Halliday et al. |
| D563,161 S * | 3/2008 | Bodum .................. D7/399 |
| D567,021 S | 4/2008 | Bach et al. |
| 7,377,089 B2 | 5/2008 | Rapparini |
| 7,387,063 B2 | 6/2008 | Vu et al. |
| 7,444,925 B2 | 11/2008 | Mahlich |
| 7,461,587 B2 | 12/2008 | Guerrero |
| 7,487,712 B2 | 2/2009 | Bowden et al. |
| 7,490,542 B2 | 2/2009 | Macchi et al. |
| 7,509,908 B1 | 3/2009 | Lassota et al. |
| 7,578,415 B2 | 8/2009 | Ziesel et al. |
| 7,592,027 B2 | 9/2009 | Halliday et al. |
| 7,604,826 B2 | 10/2009 | Denisart et al. |
| 7,640,843 B2 | 1/2010 | Halliday et al. |
| 7,673,558 B2 | 3/2010 | Panesar et al. |
| 7,681,492 B2 | 3/2010 | Liverani et al. |
| 7,685,931 B2 | 3/2010 | Rivera |
| 7,703,381 B2 | 4/2010 | Liverani et al. |
| 7,730,829 B2 | 6/2010 | Hammad |
| 7,836,819 B2 | 11/2010 | Liverani et al. |
| 7,836,820 B2 | 11/2010 | Hammad |
| 7,845,270 B2 | 12/2010 | Rahn et al. |
| 7,854,192 B2 | 12/2010 | Denisart et al. |
| 7,856,920 B2 | 12/2010 | Schmed et al. |
| 7,861,645 B2 | 1/2011 | Yuen et al. |
| 7,930,972 B2 | 4/2011 | Denisart et al. |
| 7,946,217 B2 | 5/2011 | Favre et al. |
| 7,980,169 B2 | 7/2011 | Fischer |
| 7,987,768 B2 | 8/2011 | Green et al. |
| 7,997,187 B2 | 8/2011 | Garman et al. |
| 8,012,523 B2 | 9/2011 | Voss et al. |
| 8,047,126 B2 | 11/2011 | Doglioni Majer |
| 8,047,127 B2 | 11/2011 | Lin |
| 8,051,766 B1 | 11/2011 | Yu et al. |
| 8,087,347 B2 | 1/2012 | Halliday et al. |
| 8,147,887 B2 | 4/2012 | Dogan et al. |
| 8,162,177 B2 | 4/2012 | Ziesel |
| 8,166,867 B2 | 5/2012 | Skalski et al. |
| 8,221,811 B2 | 7/2012 | Skalski et al. |
| 8,221,813 B2 | 7/2012 | Boul |
| 8,227,000 B2 | 7/2012 | Skalski et al. |
| 8,250,970 B2 | 8/2012 | Thomas |
| 8,291,812 B2 | 10/2012 | Rivera |
| 8,322,271 B2 | 12/2012 | Glucksman et al. |
| 8,327,754 B2 | 12/2012 | Kirschner et al. |
| 8,361,527 B2 | 1/2013 | Winkler et al. |
| 8,431,175 B2 | 4/2013 | Yoakim et al. |
| 8,443,717 B2 | 5/2013 | Venturi |
| 8,474,368 B2 | 7/2013 | Kilber et al. |
| 8,479,639 B2 | 7/2013 | Levin |
| 8,485,359 B2 | 7/2013 | Anderson |
| D688,095 S | 8/2013 | DeMiglio et al. |
| 8,539,876 B2 | 9/2013 | Webster et al. |
| 8,561,524 B2 | 10/2013 | DeMiglio et al. |
| 8,573,115 B2 | 11/2013 | Lai |
| D694,579 S | 12/2013 | Khubani |
| 8,601,937 B2 | 12/2013 | Campetella et al. |
| 8,621,981 B2 | 1/2014 | Rivera |
| 8,646,379 B2 | 2/2014 | Lai et al. |
| 8,695,484 B2 | 4/2014 | Möri |
| 8,707,855 B2 | 4/2014 | DeMiglio et al. |
| 8,720,320 B1 | 5/2014 | Rivera |
| D707,489 S | 6/2014 | Hertaus |
| 8,794,125 B1 | 8/2014 | Rivera |
| 8,807,392 B2 | 8/2014 | Smeller et al. |
| 8,808,778 B2 | 8/2014 | Dakis |
| 8,857,317 B2 | 10/2014 | Manser et al. |
| 8,895,090 B2 | 11/2014 | Mahlich |

(56) References Cited

U.S. PATENT DOCUMENTS

| | | |
|---|---|---|
| 8,906,436 B2 | 12/2014 | Nowak |
| D721,536 S | 1/2015 | Advani |
| 8,927,037 B2 | 1/2015 | Kihnke |
| 8,962,049 B2 | 2/2015 | Doleac et al. |
| D723,868 S | 3/2015 | Hertaus |
| 8,967,038 B2 | 3/2015 | Rivera |
| 8,978,544 B2 | 3/2015 | Leuzinger et al. |
| 8,986,764 B2 | 3/2015 | Yoakim et al. |
| RE45,476 E | 4/2015 | Burrows et al. |
| 8,999,421 B2 | 4/2015 | Clark |
| 9,023,412 B2 | 5/2015 | Doleac et al. |
| 9,085,410 B2 | 7/2015 | Beer |
| 9,108,794 B2 | 8/2015 | Fu et al. |
| 9,113,747 B2 | 8/2015 | Rivera |
| 9,120,617 B2 | 9/2015 | Beer |
| 9,149,149 B2 | 10/2015 | Oh |
| 9,150,347 B2 | 10/2015 | Scheiber |
| 9,179,797 B2 | 11/2015 | Rivera |
| 9,205,975 B2 | 12/2015 | Giovanni |
| 9,216,854 B2 | 12/2015 | Schreiber |
| 9,227,778 B2 | 1/2016 | Aviles et al. |
| 9,232,871 B2 | 1/2016 | Rivera |
| 9,232,872 B2 | 1/2016 | Rivera |
| 9,242,790 B2 | 1/2016 | Rivera |
| 9,271,597 B2 | 3/2016 | Rivera |
| 9,277,837 B2 | 3/2016 | Yoakim et al. |
| 9,295,357 B2 | 3/2016 | Tinkler et al. |
| 9,307,860 B2 | 4/2016 | Burrows |
| 9,327,900 B2 | 5/2016 | Cafaro et al. |
| 9,392,902 B2 | 7/2016 | Perentes et al. |
| 9,402,501 B1 | 8/2016 | Vu |
| 9,409,704 B2 | 8/2016 | Digiuni et al. |
| 9,415,931 B2 | 8/2016 | Gerbaulet et al. |
| 9,428,328 B2 | 8/2016 | Trombetta et al. |
| D767,331 S | 9/2016 | Burrows |
| 9,439,532 B2 | 9/2016 | Crarer et al. |
| 9,452,879 B2 | 9/2016 | Fu et al. |
| 9,469,471 B2 | 10/2016 | Dran et al. |
| D771,434 S | 11/2016 | Burrows |
| 9,486,108 B1 | 11/2016 | Douglas et al. |
| 9,487,348 B2 | 11/2016 | Roberts et al. |
| 9,521,921 B2 | 12/2016 | Joseph |
| 9,521,923 B2 | 12/2016 | Priley |
| 9,527,661 B2 | 12/2016 | Fu et al. |
| 9,572,452 B2 | 2/2017 | Rivera |
| 9,688,465 B2 | 6/2017 | Trombetta et al. |
| 9,730,551 B2 | 8/2017 | Douglas et al. |
| 9,743,796 B2 | 8/2017 | Richardson |
| 9,743,797 B2 | 8/2017 | Richardson |
| 9,750,370 B2 | 9/2017 | Beaulieu et al. |
| 9,756,974 B2 | 9/2017 | Rivera |
| 9,764,891 B1 | 9/2017 | Aviles et al. |
| 9,782,035 B2 | 10/2017 | Perentes et al. |
| 9,783,361 B2 | 10/2017 | Koller et al. |
| 9,795,243 B2 | 10/2017 | Rivera |
| 9,809,379 B2 | 11/2017 | Cardoso |
| 9,844,292 B2 | 12/2017 | Rivera |
| 9,877,495 B2 | 1/2018 | Charles |
| 9,883,766 B2 | 2/2018 | Nachawati |
| 9,907,425 B2 | 3/2018 | Rivera |
| 9,936,834 B2 | 4/2018 | Novak et al. |
| 9,938,075 B2 | 4/2018 | Trombley |
| 9,944,455 B2 | 4/2018 | Savage |
| 10,034,570 B2 | 7/2018 | Lo Faro et al. |
| 10,035,645 B2 | 7/2018 | Schroeder et al. |
| 10,071,851 B2 | 9/2018 | Vu |
| 10,093,478 B2 | 10/2018 | Bartoli et al. |
| 10,144,579 B2 | 12/2018 | Perentes et al. |
| 10,154,751 B2 | 12/2018 | DeMiglio et al. |
| 10,196,201 B2 | 2/2019 | Doglioni Majer |
| 10,219,647 B2 | 3/2019 | Richardson |
| 10,231,568 B2 | 3/2019 | Richardson |
| 10,252,854 B2 | 4/2019 | Vu |
| 10,258,186 B2 | 4/2019 | Rivera |
| 10,336,531 B2 | 7/2019 | Trombetta et al. |
| 10,450,130 B2 | 10/2019 | Hansen |
| 10,450,131 B2 | 10/2019 | Norton et al. |
| 10,470,605 B2 | 11/2019 | Ergican et al. |
| 10,543,977 B2 | 1/2020 | Brockman et al. |
| 10,611,507 B2 | 4/2020 | Trombetta et al. |
| 10,687,655 B2 | 6/2020 | Brandsma et al. |
| 10,702,096 B2 | 7/2020 | Rivera et al. |
| 10,717,574 B2 | 7/2020 | Gualandi et al. |
| 10,722,066 B2 | 7/2020 | Rivera |
| 10,865,039 B2 | 12/2020 | Rivera |
| 10,912,407 B2 | 2/2021 | Rivera et al. |
| 11,001,436 B2 | 5/2021 | Marcinkowski |
| 11,013,364 B2 | 5/2021 | Rivera |
| 11,013,365 B2 | 5/2021 | Short et al. |
| 11,021,284 B2 | 6/2021 | Rivera |
| 11,053,110 B2 | 7/2021 | Lazatin et al. |
| 11,166,587 B2 | 11/2021 | Van Davelaar |
| 11,246,445 B2 | 2/2022 | Richardson |
| 11,278,149 B2 | 3/2022 | Ulman et al. |
| 11,337,543 B2 | 5/2022 | Rivera |
| 11,369,226 B2 | 6/2022 | Rivera |
| 11,465,830 B2 | 10/2022 | Krüger |
| 11,534,017 B2 | 12/2022 | DeMiglio et al. |
| 11,534,020 B2 | 12/2022 | Rivera |
| 11,634,271 B2 | 4/2023 | McHugh et al. |
| 11,638,499 B2 | 5/2023 | Rivera |
| 11,684,198 B2 | 6/2023 | DeMiglio et al. |
| 11,723,380 B2 | 8/2023 | Rivera et al. |
| 11,724,873 B2 | 8/2023 | Lach et al. |
| 11,730,306 B2 | 8/2023 | Oh |
| 11,730,307 B2 | 8/2023 | Sasena et al. |
| 11,737,597 B2 | 8/2023 | Rivera |
| 11,745,996 B1 | 9/2023 | Zbedlick |
| 11,805,934 B1 | 11/2023 | Rivera |
| 11,832,755 B2 | 12/2023 | Rivera |
| 11,849,877 B2 | 12/2023 | Richardson |
| 11,903,518 B2 | 2/2024 | Rivera |
| 12,096,876 B2 | 9/2024 | DeMiglio et al. |
| D1,055,632 S | 12/2024 | Lemmer et al. |
| 12,185,866 B2 | 1/2025 | Rivera |
| 12,185,867 B2 | 1/2025 | Rivera |
| 12,245,715 B2 | 3/2025 | DeMiglio et al. |
| 2001/0043954 A1 | 11/2001 | Sweet |
| 2002/0005367 A1 | 1/2002 | Zelson |
| 2002/0023543 A1 | 2/2002 | Schmed |
| 2002/0035929 A1 | 3/2002 | Kanba et al. |
| 2002/0048621 A1 | 4/2002 | Boyd et al. |
| 2002/0059870 A1 | 5/2002 | Walters, Jr. et al. |
| 2002/0078831 A1 | 6/2002 | Cai |
| 2002/0088807 A1 | 7/2002 | Perkovic et al. |
| 2002/0144602 A1 | 10/2002 | Taylor et al. |
| 2002/0144603 A1 | 10/2002 | Taylor |
| 2002/0144604 A1 | 10/2002 | Winkler et al. |
| 2002/0148356 A1 | 10/2002 | Lazaris et al. |
| 2002/0148358 A1 | 10/2002 | Sweeney et al. |
| 2002/0152895 A1 | 10/2002 | Duffy et al. |
| 2003/0006185 A1 | 1/2003 | Hepler |
| 2003/0041739 A1 | 3/2003 | Cai |
| 2003/0167928 A1 | 9/2003 | Mulle et al. |
| 2003/0172813 A1 | 9/2003 | Schifferle |
| 2003/0200872 A1 | 10/2003 | Lin |
| 2003/0213370 A1 | 11/2003 | Hammad et al. |
| 2003/0222089 A1 | 12/2003 | Hale |
| 2003/0226449 A1 | 12/2003 | Carasso et al. |
| 2004/0005384 A1 | 1/2004 | Cai |
| 2004/0020368 A1 | 2/2004 | Cai |
| 2004/0020922 A1 | 2/2004 | Alves |
| 2004/0045443 A1 | 3/2004 | Lazaris et al. |
| 2004/0055472 A1 | 3/2004 | Stoner |
| 2004/0060451 A1 | 4/2004 | Leung et al. |
| 2004/0089158 A1 | 5/2004 | Mahlich |
| 2004/0118290 A1 | 6/2004 | Cai |
| 2004/0163543 A1 | 8/2004 | Hu et al. |
| 2004/0182247 A1 | 9/2004 | Guerrero |
| 2004/0216616 A1 | 11/2004 | Meador |
| 2004/0244600 A1 | 12/2004 | Lalanne-Eygun |
| 2004/0250686 A1 | 12/2004 | Hale |
| 2005/0051478 A1 | 3/2005 | Karanikos et al. |
| 2005/0095158 A1 | 5/2005 | Kirschner et al. |

(56) References Cited

U.S. PATENT DOCUMENTS

| | | |
|---|---|---|
| 2005/0115415 A1 | 6/2005 | Arrick et al. |
| 2005/0150390 A1 | 7/2005 | Schifferle |
| 2005/0150391 A1 | 7/2005 | Schifferle |
| 2005/0160918 A1 | 7/2005 | Winstanley |
| 2005/0166763 A1 | 8/2005 | Scarchilli et al. |
| 2005/0172819 A1 | 8/2005 | Chen et al. |
| 2005/0188854 A1 | 9/2005 | Green et al. |
| 2005/0211102 A1 | 9/2005 | Vu et al. |
| 2005/0217213 A1 | 10/2005 | Lozinski et al. |
| 2005/0223904 A1 | 10/2005 | Laigneau et al. |
| 2005/0236323 A1 | 10/2005 | Oliver et al. |
| 2005/0257695 A1 | 11/2005 | Dobranski et al. |
| 2005/0266122 A1 | 12/2005 | Franceschi |
| 2005/0284303 A1 | 12/2005 | Zell et al. |
| 2006/0011066 A1 | 1/2006 | Bunn et al. |
| 2006/0019000 A1 | 1/2006 | Zanetti |
| 2006/0065127 A1 | 3/2006 | Dalton et al. |
| 2006/0107841 A1 | 5/2006 | Schifferle |
| 2006/0110507 A1 | 5/2006 | Yoakim et al. |
| 2006/0150823 A1 | 7/2006 | Thomas |
| 2006/0159815 A1 | 7/2006 | Crook et al. |
| 2006/0169150 A1 | 8/2006 | Voss et al. |
| 2006/0174769 A1 | 8/2006 | Favre et al. |
| 2006/0196364 A1 | 9/2006 | Kirschner |
| 2006/0196384 A1 | 9/2006 | Faulcon |
| 2006/0236871 A1 | 10/2006 | Ternite et al. |
| 2006/0254428 A1 | 11/2006 | Glucksman et al. |
| 2007/0017382 A1 | 1/2007 | Takizawa |
| 2007/0039477 A1 | 2/2007 | Bowden et al. |
| 2007/0062375 A1 | 3/2007 | Liverani et al. |
| 2007/0068395 A1 | 3/2007 | Masek et al. |
| 2007/0084352 A1 | 4/2007 | Yuen et al. |
| 2007/0144355 A1 | 6/2007 | Denisart et al. |
| 2007/0148290 A1 | 6/2007 | Ternite et al. |
| 2007/0151460 A1 | 7/2007 | Beck |
| 2007/0157821 A1 | 7/2007 | Panesar et al. |
| 2007/0163446 A1 | 7/2007 | Halliday et al. |
| 2007/0163447 A1 | 7/2007 | Tremblay |
| 2007/0175334 A1 | 8/2007 | Halliday et al. |
| 2007/0175335 A1 | 8/2007 | Liverani et al. |
| 2007/0181003 A1 | 8/2007 | Bardazzi |
| 2007/0186784 A1 | 8/2007 | Liverani et al. |
| 2007/0193452 A1 | 8/2007 | Campetella et al. |
| 2007/0201303 A1 | 8/2007 | Kanzer et al. |
| 2007/0259074 A1 | 11/2007 | Searchilli et al. |
| 2007/0277677 A1 | 12/2007 | Roberg |
| 2008/0026121 A1 | 1/2008 | Mastropasqua et al. |
| 2008/0105131 A1 | 5/2008 | Castellani |
| 2008/0187638 A1 | 8/2008 | Hansen |
| 2008/0216666 A1 | 9/2008 | Doglioni Majer |
| 2008/0216667 A1 | 9/2008 | Garman |
| 2008/0245236 A1 | 10/2008 | Ternite et al. |
| 2008/0245466 A1 | 10/2008 | Schmal et al. |
| 2008/0257165 A1 | 10/2008 | Bolzicco et al. |
| 2008/0317931 A1 | 12/2008 | Mandralis et al. |
| 2009/0004335 A1 | 1/2009 | Macmahon |
| 2009/0007793 A1 | 1/2009 | Glucksman et al. |
| 2009/0007794 A1 | 1/2009 | Cortese |
| 2009/0007796 A1 | 1/2009 | Ricotti |
| 2009/0017177 A1 | 1/2009 | Yoakim et al. |
| 2009/0057332 A1 | 3/2009 | Arzola |
| 2009/0110775 A1 | 4/2009 | Rijskamp et al. |
| 2009/0126577 A1 | 5/2009 | Ternite |
| 2009/0155422 A1 | 6/2009 | Ozanne |
| 2009/0158938 A1 | 6/2009 | Jarisch et al. |
| 2009/0175986 A1 | 7/2009 | Doglioni Majer |
| 2009/0183640 A1 | 7/2009 | Ozanne |
| 2009/0202691 A1 | 8/2009 | Gauger |
| 2009/0205503 A1 | 8/2009 | Cortese |
| 2009/0211458 A1 | 8/2009 | Denisart et al. |
| 2009/0223373 A1 | 9/2009 | Kollep et al. |
| 2009/0223375 A1 | 9/2009 | Verbeek |
| 2009/0229470 A1 | 9/2009 | Dorfmueller |
| 2009/0229471 A1 | 9/2009 | Lun et al. |
| 2009/0230149 A1 | 9/2009 | Smeller et al. |
| 2009/0235827 A1 | 9/2009 | Bongers et al. |
| 2009/0260521 A1 | 10/2009 | Tatsuno |
| 2009/0263545 A1 | 10/2009 | Ozanne |
| 2009/0320692 A1 | 12/2009 | Simanski |
| 2009/0320693 A1 | 12/2009 | Ozanne |
| 2010/0000960 A1 | 1/2010 | Anderson |
| 2010/0003371 A1 | 1/2010 | Ozanne et al. |
| 2010/0005973 A1 | 1/2010 | Doglioni Majer |
| 2010/0037779 A1 | 2/2010 | Pecci et al. |
| 2010/0037780 A1 | 2/2010 | Pas et al. |
| 2010/0047419 A1 | 2/2010 | Boul |
| 2010/0062127 A1 | 3/2010 | Bongers |
| 2010/0064899 A1 | 3/2010 | Aardenburg |
| 2010/0078480 A1 | 4/2010 | Aker |
| 2010/0083843 A1 | 4/2010 | Denisart et al. |
| 2010/0101428 A1 | 4/2010 | Fin |
| 2010/0108541 A1 | 5/2010 | Roberto |
| 2010/0126354 A1 | 5/2010 | Mahlich |
| 2010/0129512 A1 | 5/2010 | Accursi |
| 2010/0132564 A1 | 6/2010 | Ozanne et al. |
| 2010/0147156 A1 | 6/2010 | Colantonio et al. |
| 2010/0154644 A1 | 6/2010 | Skalski et al. |
| 2010/0154647 A1 | 6/2010 | Skalski et al. |
| 2010/0154651 A1 | 6/2010 | Skalski et al. |
| 2010/0159109 A1 | 6/2010 | Van Puijenbroek et al. |
| 2010/0173056 A1 | 7/2010 | Yoakim et al. |
| 2010/0178392 A1 | 7/2010 | Yoakim et al. |
| 2010/0180774 A1 | 7/2010 | Kollep et al. |
| 2010/0186599 A1 | 7/2010 | Yoakim et al. |
| 2010/0203198 A1 | 8/2010 | Yoakim et al. |
| 2010/0203208 A1 | 8/2010 | Yoakim et al. |
| 2010/0206177 A1 | 8/2010 | Ricotti |
| 2010/0229729 A1 | 9/2010 | Garcia et al. |
| 2010/0239734 A1 | 9/2010 | Yoakim et al. |
| 2010/0251899 A1 | 10/2010 | Lin |
| 2010/0282087 A1 | 11/2010 | Boussemart et al. |
| 2010/0288131 A1 | 11/2010 | Kilber et al. |
| 2010/0297299 A1 | 11/2010 | Epars et al. |
| 2010/0303964 A1 | 12/2010 | Beaulieu et al. |
| 2010/0303965 A1 | 12/2010 | Mariller |
| 2010/0307930 A1 | 12/2010 | Zangerle |
| 2011/0005399 A1 | 1/2011 | Epars et al. |
| 2011/0020497 A1 | 1/2011 | Steven et al. |
| 2011/0041702 A1 | 2/2011 | Yoakim et al. |
| 2011/0045144 A1 | 2/2011 | Boussemart et al. |
| 2011/0064852 A1 | 3/2011 | Mann |
| 2011/0073607 A1 | 3/2011 | Fu et al. |
| 2011/0076361 A1 | 3/2011 | Peterson et al. |
| 2011/0081466 A1 | 4/2011 | Lassota |
| 2011/0097450 A1 | 4/2011 | Krüger |
| 2011/0100228 A1 | 5/2011 | Rivera |
| 2011/0100229 A1 | 5/2011 | Rivera |
| 2011/0113969 A1 | 5/2011 | Rivera |
| 2011/0117248 A1 | 5/2011 | Rivera |
| 2011/0142996 A1 | 6/2011 | Krüger |
| 2011/0151075 A1 | 6/2011 | Peterson |
| 2011/0168029 A1 | 7/2011 | Fulco |
| 2011/0185910 A1 | 8/2011 | Ryser |
| 2011/0189350 A1 | 8/2011 | Belleghem et al. |
| 2011/0189362 A1 | 8/2011 | Denisart et al. |
| 2011/0197771 A1 | 8/2011 | Bolzicco et al. |
| 2011/0209623 A1 | 9/2011 | Leung et al. |
| 2011/0259204 A1 | 10/2011 | Kaeser et al. |
| 2011/0262601 A1 | 10/2011 | Manser et al. |
| 2011/0274794 A1 | 11/2011 | Gerbaulet et al. |
| 2011/0274802 A1 | 11/2011 | Rivera |
| 2011/0283890 A1 | 11/2011 | Scrivani |
| 2011/0283891 A1 | 11/2011 | Mariller |
| 2011/0297005 A1 | 12/2011 | Mariller |
| 2011/0303095 A1 | 12/2011 | Fu et al. |
| 2011/0305801 A1 | 12/2011 | Beer |
| 2012/0015080 A1 | 1/2012 | Roulin et al. |
| 2012/0015081 A1 | 1/2012 | Crump et al. |
| 2012/0052163 A1 | 3/2012 | Doleac et al. |
| 2012/0052164 A1 | 3/2012 | Doleac et al. |
| 2012/0058226 A1 | 3/2012 | Winkler et al. |
| 2012/0070543 A1 | 3/2012 | Mahlich |
| 2012/0070551 A1 | 3/2012 | Mahlich |
| 2012/0090475 A1 | 4/2012 | Deuber |

(56) References Cited

U.S. PATENT DOCUMENTS

| | | |
|---|---|---|
| 2012/0097041 A1 | 4/2012 | Bucher et al. |
| 2012/0097602 A1 | 4/2012 | Tedford |
| 2012/0100259 A1 | 4/2012 | Rapparini |
| 2012/0118166 A1 | 5/2012 | Macchi |
| 2012/0118880 A1 | 5/2012 | Wnek |
| 2012/0121779 A1 | 5/2012 | Lai et al. |
| 2012/0121780 A1 | 5/2012 | Lai et al. |
| 2012/0148709 A1 | 6/2012 | Kamerbeek et al. |
| 2012/0171333 A1 | 7/2012 | Crump et al. |
| 2012/0196008 A1 | 8/2012 | York |
| 2012/0201932 A1 | 8/2012 | Kihnke |
| 2012/0201933 A1 | 8/2012 | Dran et al. |
| 2012/0207895 A1 | 8/2012 | Rivera |
| 2012/0207896 A1 | 8/2012 | Rivera |
| 2012/0240779 A1 | 9/2012 | Perentes et al. |
| 2012/0251668 A1 | 10/2012 | Wong et al. |
| 2012/0251671 A1 | 10/2012 | Kamerbeek et al. |
| 2012/0258210 A1 | 10/2012 | Wong et al. |
| 2012/0269933 A1 | 10/2012 | Rapparini |
| 2012/0276264 A1 | 11/2012 | Rivera |
| 2012/0285330 A1 | 11/2012 | Demiglio et al. |
| 2012/0285334 A1 | 11/2012 | Demiglio et al. |
| 2012/0295234 A1 | 11/2012 | Rognon et al. |
| 2012/0308688 A1 | 12/2012 | Peterson et al. |
| 2012/0321748 A1 | 12/2012 | Otto et al. |
| 2012/0321756 A1 | 12/2012 | Estabrook et al. |
| 2012/0328739 A1 | 12/2012 | Nocera |
| 2013/0014648 A1 | 1/2013 | Rognon et al. |
| 2013/0017303 A1 | 1/2013 | Vu |
| 2013/0025466 A1 | 1/2013 | Fu et al. |
| 2013/0040021 A1 | 2/2013 | Digiuni |
| 2013/0045307 A1 | 2/2013 | Safai et al. |
| 2013/0055903 A1 | 3/2013 | Deuber |
| 2013/0055904 A1 | 3/2013 | DeMiglio et al. |
| 2013/0059039 A1 | 3/2013 | Trombetta et al. |
| 2013/0061764 A1 | 3/2013 | Rivera |
| 2013/0064936 A1 | 3/2013 | Meelker et al. |
| 2013/0064937 A1 | 3/2013 | Jarisch et al. |
| 2013/0078341 A1 | 3/2013 | York |
| 2013/0095212 A1 | 4/2013 | Beer |
| 2013/0095214 A1 | 4/2013 | Ozanne et al. |
| 2013/0105340 A1 | 5/2013 | Hother et al. |
| 2013/0112576 A1 | 5/2013 | Hother et al. |
| 2013/0115340 A1 | 5/2013 | Doleac et al. |
| 2013/0118360 A1 | 5/2013 | Dogan et al. |
| 2013/0122157 A1 | 5/2013 | Dogan et al. |
| 2013/0125762 A1 | 5/2013 | Dogan et al. |
| 2013/0129870 A1 | 5/2013 | Novak et al. |
| 2013/0129872 A1 | 5/2013 | Krüger |
| 2013/0129876 A1 | 5/2013 | Ye et al. |
| 2013/0133522 A1 | 5/2013 | Denisart et al. |
| 2013/0136828 A1 | 5/2013 | Anghileri |
| 2013/0139699 A1 | 6/2013 | Rivera |
| 2013/0139700 A1 | 6/2013 | Fabozzi et al. |
| 2013/0146495 A1 | 6/2013 | Fabozzi et al. |
| 2013/0156897 A1 | 6/2013 | Goldstein |
| 2013/0164414 A1 | 6/2013 | Hermanowski et al. |
| 2013/0180409 A1 | 7/2013 | Dogan et al. |
| 2013/0186282 A1 | 7/2013 | Guo et al. |
| 2013/0209618 A1 | 8/2013 | Trombetta et al. |
| 2013/0216663 A1 | 8/2013 | Dogan et al. |
| 2013/0220142 A1 | 8/2013 | Tremblay |
| 2013/0230627 A1 | 9/2013 | Hansen et al. |
| 2013/0236609 A1 | 9/2013 | Magniet et al. |
| 2013/0243910 A1 | 9/2013 | Krüger et al. |
| 2013/0247774 A1 | 9/2013 | Macchiavelli et al. |
| 2013/0259983 A1 | 10/2013 | Vanni et al. |
| 2013/0270176 A1 | 10/2013 | Schreiber |
| 2013/0302476 A1 | 11/2013 | Abegglen et al. |
| 2013/0312619 A1 | 11/2013 | Spiegel et al. |
| 2013/0323381 A1 | 12/2013 | Dakis |
| 2013/0327223 A1 | 12/2013 | Bartoli et al. |
| 2013/0340626 A1 | 12/2013 | Oh |
| 2013/0344206 A1 | 12/2013 | Yoakim et al. |
| 2014/0004231 A1 | 1/2014 | Norton et al. |
| 2014/0008368 A1 | 1/2014 | Severini |
| 2014/0017359 A1 | 1/2014 | Krüger et al. |
| 2014/0020565 A1 | 1/2014 | Nabeiro |
| 2014/0026761 A1 | 1/2014 | Bartoli et al. |
| 2014/0037802 A1 | 2/2014 | Cardoso |
| 2014/0053735 A1 | 2/2014 | Verbeek |
| 2014/0065269 A1 | 3/2014 | Favre |
| 2014/0069280 A1 | 3/2014 | Frydman |
| 2014/0072675 A1 | 3/2014 | Norton et al. |
| 2014/0072676 A1 | 3/2014 | Moutty |
| 2014/0072677 A1 | 3/2014 | Hansen |
| 2014/0076169 A1 | 3/2014 | Nabeiro |
| 2014/0076170 A1 | 3/2014 | Epars et al. |
| 2014/0087028 A1 | 3/2014 | Orsi |
| 2014/0090564 A1 | 4/2014 | Vanni et al. |
| 2014/0106036 A1 | 4/2014 | Cardoso |
| 2014/0120217 A1 | 5/2014 | O'Brien et al. |
| 2014/0123859 A1 | 5/2014 | Verbeek |
| 2014/0124435 A1 | 5/2014 | Jackson |
| 2014/0127364 A1 | 5/2014 | Fu et al. |
| 2014/0130680 A1 | 5/2014 | Fin et al. |
| 2014/0141128 A1 | 5/2014 | Trombetta et al. |
| 2014/0161936 A1 | 6/2014 | Trombetta et al. |
| 2014/0161940 A1 | 6/2014 | Aviles et al. |
| 2014/0170269 A1 | 6/2014 | Schreiber |
| 2014/0170271 A1 | 6/2014 | Zweed et al. |
| 2014/0174300 A1 | 6/2014 | Husband et al. |
| 2014/0178538 A1 | 6/2014 | Husband et al. |
| 2014/0186498 A1 | 7/2014 | Dogan et al. |
| 2014/0190863 A1 | 7/2014 | Fabozzi et al. |
| 2014/0196608 A1 | 7/2014 | Amrein et al. |
| 2014/0205721 A1 | 7/2014 | Orsi |
| 2014/0220189 A1 | 8/2014 | Giovanni |
| 2014/0220190 A1 | 8/2014 | Giovanni |
| 2014/0224130 A1 | 8/2014 | Castellani et al. |
| 2014/0242239 A1 | 8/2014 | Boggavarapu |
| 2014/0245893 A1 | 9/2014 | Vu |
| 2014/0245895 A1 | 9/2014 | DeMiglio et al. |
| 2014/0272016 A1 | 9/2014 | Nowak |
| 2014/0272018 A1 | 9/2014 | Koller et al. |
| 2014/0287099 A1 | 9/2014 | Trombetta |
| 2014/0287104 A1 | 9/2014 | Austin et al. |
| 2014/0287105 A1 | 9/2014 | Husband et al. |
| 2014/0290493 A1 | 10/2014 | Rivera |
| 2014/0290494 A1 | 10/2014 | Chia |
| 2014/0295032 A1 | 10/2014 | Magri et al. |
| 2014/0299000 A1 | 10/2014 | Hanneson et al. |
| 2014/0302204 A1 | 10/2014 | Evers et al. |
| 2014/0305315 A1 | 10/2014 | Perentes et al. |
| 2014/0314919 A1 | 10/2014 | Perentes et al. |
| 2014/0318378 A1 | 10/2014 | Ertur et al. |
| 2014/0318379 A1 | 10/2014 | Perentes et al. |
| 2014/0318380 A1 | 10/2014 | Doglioni Majer |
| 2014/0318381 A1 | 10/2014 | Talon et al. |
| 2014/0328983 A1 | 11/2014 | Jarisch et al. |
| 2014/0342059 A1 | 11/2014 | Trombetta et al. |
| 2014/0342060 A1 | 11/2014 | Bartoli et al. |
| 2014/0356484 A1 | 12/2014 | Capitani |
| 2014/0373725 A1 | 12/2014 | Mastropasqua et al. |
| 2014/0377413 A1 | 12/2014 | Liu |
| 2015/0001100 A1 | 1/2015 | Bartoli et al. |
| 2015/0017290 A1 | 1/2015 | Rondelli |
| 2015/0017293 A1 | 1/2015 | Carr et al. |
| 2015/0021209 A1 | 1/2015 | Rondelli |
| 2015/0027318 A1 | 1/2015 | Dogan et al. |
| 2015/0034127 A1 | 2/2015 | Talon et al. |
| 2015/0040769 A1 | 2/2015 | Righetti |
| 2015/0047509 A1 | 2/2015 | Trombetta et al. |
| 2015/0050391 A1 | 2/2015 | Rapparini |
| 2015/0056331 A1 | 2/2015 | Rivera |
| 2015/0056340 A1 | 2/2015 | Trombetta et al. |
| 2015/0056351 A1 | 2/2015 | Deuber |
| 2015/0056352 A1 | 2/2015 | Dogan et al. |
| 2015/0068404 A1 | 3/2015 | Rivera |
| 2015/0068405 A1 | 3/2015 | Bartoli et al. |
| 2015/0072052 A1 | 3/2015 | Bartoli et al. |
| 2015/0072053 A1 | 3/2015 | Dogan et al. |
| 2015/0082989 A1 | 3/2015 | Besson et al. |
| 2015/0086680 A1 | 3/2015 | Kamerbeek |

(56) References Cited

U.S. PATENT DOCUMENTS

| | | |
|---|---|---|
| 2015/0090300 A1 | 4/2015 | Dyer |
| 2015/0108011 A1 | 4/2015 | Bartoli et al. |
| 2015/0125576 A1 | 5/2015 | Dogan |
| 2015/0135962 A1 | 5/2015 | Jarisch et al. |
| 2015/0135967 A1 | 5/2015 | Hoffman et al. |
| 2015/0140182 A1 | 5/2015 | Dogan et al. |
| 2015/0150409 A1 | 6/2015 | Cross et al. |
| 2015/0150412 A1 | 6/2015 | Heitele |
| 2015/0151903 A1 | 6/2015 | Bartoli et al. |
| 2015/0157164 A1 | 6/2015 | Digiuni |
| 2015/0158609 A1 | 6/2015 | Villain et al. |
| 2015/0158666 A1 | 6/2015 | Krüger et al. |
| 2015/0164262 A1 | 6/2015 | Dingle et al. |
| 2015/0173555 A1 | 6/2015 | Sumiyoshi et al. |
| 2015/0173562 A1 | 6/2015 | Priley |
| 2015/0175347 A1 | 6/2015 | Empl |
| 2015/0182059 A1 | 7/2015 | Richardson |
| 2015/0183577 A1 | 7/2015 | Talon et al. |
| 2015/0196159 A1 | 7/2015 | Spiegel et al. |
| 2015/0201790 A1 | 7/2015 | Smith et al. |
| 2015/0201791 A1 | 7/2015 | Tinkler et al. |
| 2015/0203285 A1 | 7/2015 | Baldo |
| 2015/0208852 A1 | 7/2015 | Doglioni Majer |
| 2015/0208853 A1 | 7/2015 | Melzer et al. |
| 2015/0225169 A1 | 8/2015 | Jarisch |
| 2015/0230652 A1 | 8/2015 | Chalk et al. |
| 2015/0238044 A1 | 8/2015 | Halliday et al. |
| 2015/0239652 A1 | 8/2015 | Trombetta et al. |
| 2015/0245733 A1 | 9/2015 | Castellani |
| 2015/0246741 A1 | 9/2015 | Hansen et al. |
| 2015/0246768 A1 | 9/2015 | Talon |
| 2015/0251847 A1 | 9/2015 | Talon |
| 2015/0257580 A1 | 9/2015 | Crarer et al. |
| 2015/0264955 A1 | 9/2015 | Rivera |
| 2015/0272379 A1 | 10/2015 | Perentes et al. |
| 2015/0282663 A1 | 10/2015 | Talon |
| 2015/0297021 A1 | 10/2015 | Bugnano et al. |
| 2015/0307266 A1 | 10/2015 | Zanetti |
| 2015/0314954 A1 | 11/2015 | Empl |
| 2015/0314955 A1 | 11/2015 | Savage |
| 2015/0320254 A1 | 11/2015 | Perentes et al. |
| 2015/0327717 A1 | 11/2015 | Burrows |
| 2015/0329282 A1 | 11/2015 | Bartoli et al. |
| 2015/0336736 A1 | 11/2015 | Cabilli |
| 2015/0344285 A1 | 12/2015 | Joseph |
| 2015/0353272 A1 | 12/2015 | Mariller et al. |
| 2015/0353275 A1 | 12/2015 | Accursi |
| 2015/0359377 A1 | 12/2015 | Graham |
| 2015/0360854 A1 | 12/2015 | Massey et al. |
| 2015/0368033 A1 | 12/2015 | Krug et al. |
| 2015/0374165 A1 | 12/2015 | Rivera |
| 2016/0001903 A1 | 1/2016 | Bartoli et al. |
| 2016/0001968 A1 | 1/2016 | Krüger et al. |
| 2016/0009486 A1 | 1/2016 | Bugnano et al. |
| 2016/0016727 A1 | 1/2016 | Katz |
| 2016/0029833 A1 | 2/2016 | Lin |
| 2016/0037961 A1 | 2/2016 | Digiuni |
| 2016/0045059 A1 | 2/2016 | Cross et al. |
| 2016/0045061 A1 | 2/2016 | Balestier et al. |
| 2016/0045063 A1 | 2/2016 | Mantle et al. |
| 2016/0051080 A1 | 2/2016 | Lo Faro et al. |
| 2016/0052706 A1 | 2/2016 | Talon et al. |
| 2016/0066591 A1 | 3/2016 | Halliday et al. |
| 2016/0068334 A1 | 3/2016 | Cafaro et al. |
| 2016/0068336 A1 | 3/2016 | Biesheuvel et al. |
| 2016/0075506 A1 | 3/2016 | Chapman et al. |
| 2016/0107831 A1 | 4/2016 | Talon et al. |
| 2016/0113435 A1 | 4/2016 | Cabilli et al. |
| 2016/0120356 A1 | 5/2016 | Kohli et al. |
| 2016/0130076 A1 | 5/2016 | Jarisch |
| 2016/0137401 A1 | 5/2016 | Heydel et al. |
| 2016/0137402 A1 | 5/2016 | Talon et al. |
| 2016/0145037 A1 | 5/2016 | Trombley |
| 2016/0145038 A1 | 5/2016 | Apone et al. |
| 2016/0150909 A1 | 6/2016 | Rivera |
| 2016/0157659 A1 | 6/2016 | Rivera |
| 2016/0157660 A1 | 6/2016 | Rivera |
| 2016/0157666 A1 | 6/2016 | Brandsma et al. |
| 2016/0174757 A1 | 6/2016 | Rivera |
| 2016/0176624 A1 | 6/2016 | Talon |
| 2016/0176625 A1 | 6/2016 | Brockman et al. |
| 2016/0192807 A1 | 7/2016 | Bouziad et al. |
| 2016/0194147 A1 | 7/2016 | Harrington et al. |
| 2016/0198732 A1 | 7/2016 | Charles |
| 2016/0198886 A1 | 7/2016 | Avins et al. |
| 2016/0206133 A1 | 7/2016 | Rivera |
| 2016/0207696 A9 | 7/2016 | Trombetta et al. |
| 2016/0213194 A1 | 7/2016 | Webster et al. |
| 2016/0214787 A1 | 7/2016 | Iotti |
| 2016/0227958 A1 | 8/2016 | Zhao |
| 2016/0242594 A1 | 8/2016 | Empl et al. |
| 2016/0251150 A1 | 9/2016 | Macchi et al. |
| 2016/0280430 A1 | 9/2016 | Petlikovski |
| 2016/0280453 A1 | 9/2016 | Accursi |
| 2016/0288990 A1 | 10/2016 | Roberts et al. |
| 2016/0302613 A1 | 10/2016 | Cross et al. |
| 2016/0311608 A1 | 10/2016 | Accursi |
| 2016/0311609 A1 | 10/2016 | Deuber |
| 2016/0311610 A1 | 10/2016 | Deuber et al. |
| 2016/0325898 A1 | 11/2016 | Footz |
| 2016/0332805 A1 | 11/2016 | Krupa et al. |
| 2016/0345769 A1 | 12/2016 | Clausen et al. |
| 2016/0360917 A1 | 12/2016 | Richardson |
| 2016/0367064 A1 | 12/2016 | DeMiglio |
| 2017/0027376 A1 | 2/2017 | Vu |
| 2017/0036854 A1 | 2/2017 | Doglioni Majer |
| 2017/0036857 A1 | 2/2017 | Empl et al. |
| 2017/0042365 A1 | 2/2017 | Del Bon et al. |
| 2017/0043943 A1 | 2/2017 | Lamb et al. |
| 2017/0050799 A1 | 2/2017 | Anghileri |
| 2017/0071395 A1 | 3/2017 | Krüger et al. |
| 2017/0081111 A1 | 3/2017 | Wicks |
| 2017/0119203 A1 | 5/2017 | Rivera et al. |
| 2017/0120203 A1 | 5/2017 | Novak et al. |
| 2017/0143158 A1 | 5/2017 | Nachawati |
| 2017/0158422 A1 | 6/2017 | Andreae et al. |
| 2017/0174418 A1 | 6/2017 | Cai |
| 2017/0190451 A1 | 7/2017 | van der Vliet |
| 2017/0231420 A1 | 8/2017 | Rivera |
| 2017/0251861 A1 | 9/2017 | DeMiglio |
| 2017/0258260 A1 | 9/2017 | Hsu |
| 2017/0258264 A1 | 9/2017 | Holten et al. |
| 2017/0275087 A1 | 9/2017 | Perentes et al. |
| 2017/0275088 A1 | 9/2017 | Bouziad et al. |
| 2017/0275089 A1 | 9/2017 | Perentes et al. |
| 2017/0275090 A1 | 9/2017 | Dubesset et al. |
| 2017/0280750 A1 | 10/2017 | Arnaud et al. |
| 2017/0295988 A1 | 10/2017 | Chung |
| 2017/0305653 A1 | 10/2017 | Norton et al. |
| 2017/0313496 A1 | 11/2017 | Zaccanti |
| 2017/0319001 A1 | 11/2017 | Butscher et al. |
| 2017/0320658 A1 | 11/2017 | Accursi |
| 2017/0326617 A1 | 11/2017 | Shabudin et al. |
| 2017/0327308 A1 | 11/2017 | Valsecchi et al. |
| 2017/0334623 A1 | 11/2017 | Gualandi et al. |
| 2017/0334624 A1 | 11/2017 | Cabilli et al. |
| 2017/0340159 A1 | 11/2017 | Richardson |
| 2017/0355514 A1 | 12/2017 | Perentes et al. |
| 2017/0355515 A1 | 12/2017 | Marcinkowski |
| 2017/0360057 A1 | 12/2017 | Rivera et al. |
| 2017/0360239 A1 | 12/2017 | Rivera et al. |
| 2017/0361961 A1 | 12/2017 | Rivera |
| 2017/0362020 A1 | 12/2017 | Hanneson et al. |
| 2018/0002104 A1 | 1/2018 | Moura De Castro Gandra |
| 2018/0016092 A1 | 1/2018 | Dogan et al. |
| 2018/0029790 A1 | 2/2018 | Empl et al. |
| 2018/0037402 A1 | 2/2018 | Cabilli et al. |
| 2018/0044104 A1 | 2/2018 | Eppler et al. |
| 2018/0050861 A1 | 2/2018 | Rivera |
| 2018/0084941 A1 | 3/2018 | Noth |
| 2018/0110356 A1 | 4/2018 | Rivera |
| 2018/0116444 A1 | 5/2018 | Rivera |
| 2018/0116446 A1 | 5/2018 | Noth |
| 2018/0125288 A1 | 5/2018 | Noth |

(56) References Cited

U.S. PATENT DOCUMENTS

| | | |
|---|---|---|
| 2018/0134485 A1 | 5/2018 | Stefanoni |
| 2018/0148250 A1 | 5/2018 | Schaude |
| 2018/0162634 A1 | 6/2018 | De Ruvo et al. |
| 2018/0178972 A1 | 6/2018 | Mondillon et al. |
| 2018/0178973 A1 | 6/2018 | Kaiserman et al. |
| 2018/0201436 A1 | 7/2018 | Savage |
| 2018/0206667 A1 | 7/2018 | Footz |
| 2018/0215533 A1 | 8/2018 | Rossomando et al. |
| 2018/0220840 A1 | 8/2018 | Vorfeld et al. |
| 2018/0237217 A1 | 8/2018 | Stefanoni |
| 2018/0242776 A1 | 8/2018 | Schäling et al. |
| 2018/0257856 A1 | 9/2018 | Oliver |
| 2018/0263403 A1 | 9/2018 | Richardson |
| 2018/0273286 A1 | 9/2018 | Dijkstra et al. |
| 2018/0290821 A1 | 10/2018 | Domenighini |
| 2018/0290824 A1 | 10/2018 | Dijkstra et al. |
| 2018/0290825 A1 | 10/2018 | Dijkstra et al. |
| 2018/0297309 A1 | 10/2018 | Evans et al. |
| 2018/0297775 A1 | 10/2018 | Dijkstra et al. |
| 2018/0297776 A1 | 10/2018 | Dijkstra et al. |
| 2018/0303275 A1 | 10/2018 | Ergican et al. |
| 2018/0305194 A1 | 10/2018 | Corker et al. |
| 2018/0319582 A1 | 11/2018 | Footz et al. |
| 2018/0325301 A1 | 11/2018 | de Graaff et al. |
| 2018/0325309 A1 | 11/2018 | Short et al. |
| 2018/0332995 A1 | 11/2018 | Rapparini et al. |
| 2018/0346239 A1 | 12/2018 | Heydel |
| 2018/0354713 A1 | 12/2018 | Ting et al. |
| 2018/0362198 A1 | 12/2018 | Volpe et al. |
| 2018/0370720 A1 | 12/2018 | Heydel |
| 2019/0000262 A1 | 1/2019 | Vu |
| 2019/0002192 A1 | 1/2019 | Wicks et al. |
| 2019/0002193 A1 | 1/2019 | Vu |
| 2019/0016527 A1 | 1/2019 | Doglioni Majer |
| 2019/0047771 A1 | 2/2019 | Mühlemann |
| 2019/0047782 A1 | 2/2019 | Rehfuss et al. |
| 2019/0047783 A1 | 2/2019 | Brivois |
| 2019/0055083 A1 | 2/2019 | Noth et al. |
| 2019/0055084 A1 | 2/2019 | D'Urso |
| 2019/0069710 A1 | 3/2019 | DeMiglio et al. |
| 2019/0077588 A1 | 3/2019 | Bartel et al. |
| 2019/0084758 A1 | 3/2019 | Stefanoni |
| 2019/0100376 A1 | 4/2019 | Rondelli |
| 2019/0167031 A1 | 6/2019 | Rijskamp et al. |
| 2019/0177078 A1 | 6/2019 | Dijkstra et al. |
| 2019/0177079 A1 | 6/2019 | Lach et al. |
| 2019/0191913 A1 | 6/2019 | Richardson |
| 2019/0202629 A1 | 7/2019 | Bernal |
| 2019/0225413 A1 | 7/2019 | Dogan et al. |
| 2019/0225414 A1 | 7/2019 | McHugh et al. |
| 2019/0233200 A1 | 8/2019 | Mercier |
| 2019/0313835 A1 | 10/2019 | Valsecchi |
| 2019/0328026 A1 | 10/2019 | Westra et al. |
| 2019/0328170 A1 | 10/2019 | Cai |
| 2019/0382191 A1 | 12/2019 | Orler |
| 2020/0017288 A1 | 1/2020 | Nabeiro et al. |
| 2020/0047984 A1 | 2/2020 | Halliday et al. |
| 2020/0069108 A1 | 3/2020 | Rivera |
| 2020/0102144 A1 | 4/2020 | Vu |
| 2020/0107670 A1 | 4/2020 | Rivera |
| 2020/0121115 A1 | 4/2020 | Oh |
| 2020/0189772 A1 | 6/2020 | Rivera et al. |
| 2020/0231370 A1 | 7/2020 | Appleford et al. |
| 2020/0231372 A1 | 7/2020 | Parise |
| 2020/0245805 A1 | 8/2020 | DeMiglio et al. |
| 2020/0253413 A1 | 8/2020 | Orler |
| 2020/0305634 A1 | 10/2020 | Rivera |
| 2020/0315396 A1 | 10/2020 | Rivera |
| 2021/0127889 A1 | 5/2021 | Sasena et al. |
| 2021/0137302 A1 | 5/2021 | Rivera |
| 2021/0147138 A1 | 5/2021 | Affolter et al. |
| 2021/0253334 A1 | 8/2021 | Rivera |
| 2021/0259456 A1 | 8/2021 | Lynch |
| 2021/0261280 A1 | 8/2021 | Krüger et al. |
| 2021/0274960 A1 | 9/2021 | Rivera |
| 2021/0331864 A1 | 10/2021 | Zwart et al. |
| 2021/0345817 A1 | 11/2021 | Rivera |
| 2021/0369048 A1 | 12/2021 | Rivera |
| 2021/0386237 A1 | 12/2021 | Footz et al. |
| 2022/0007877 A1 | 1/2022 | Rivera |
| 2022/0071434 A1 | 3/2022 | Tseng |
| 2022/0079372 A1 | 3/2022 | Rivera |
| 2022/0125234 A1 | 4/2022 | Richardson |
| 2022/0142392 A1 | 5/2022 | Rivera |
| 2022/0273130 A1 | 9/2022 | DeMiglio et al. |
| 2022/0330742 A1 | 10/2022 | Ioannidis et al. |
| 2022/0369849 A1 | 11/2022 | Rivera |
| 2023/0063053 A1 | 3/2023 | Aldous et al. |
| 2023/0276975 A1 | 9/2023 | DeMiglio et al. |
| 2023/0414033 A1 | 12/2023 | Rivera |
| 2024/0016332 A1 | 1/2024 | Rivera |
| 2024/0122393 A1 | 4/2024 | Richardson |
| 2024/0122394 A1 | 4/2024 | Rivera |
| 2024/0122399 A1 | 4/2024 | Rivera |
| 2024/0156295 A1 | 5/2024 | DeMiglio et al. |
| 2024/0389782 A1 | 11/2024 | Rivera |
| 2024/0398147 A1 | 12/2024 | DeMiglio et al. |
| 2025/0089925 A1 | 3/2025 | Rivera |
| 2025/0089931 A1 | 3/2025 | Rivera |

FOREIGN PATENT DOCUMENTS

| | | |
|---|---|---|
| DE | 102011012860 A1 | 12/2012 |
| EP | 1183195 A1 | 3/2002 |
| EP | 1364605 B1 | 11/2005 |
| EP | 1837294 B1 | 7/2008 |
| EP | 2580145 B1 | 5/2015 |
| KR | 100535744 B1 | 1/2006 |
| NZ | 248659 A | 12/1994 |
| WO | 2005092160 A1 | 10/2005 |
| WO | 2008125256 A1 | 10/2008 |
| WO | 2009011982 A1 | 1/2009 |
| WO | 2010094026 A1 | 8/2010 |

OTHER PUBLICATIONS

PTAB Case IPR2014-00042, Final Written Decision, Feb. 6, 2015.
PTAB Case IPR2014-00042, Petitioner's Updated Exhibit List, Nov. 14, 2014.
PTAB Case IPR2014-00042, Patent Owner's Updated Exhibit List, Sep. 9, 2014.
Davids, Kenneth. Coffee: A Guide to Buying, Brewing, and Enjoying. New York: St. Martin's Griffin, 2001; pp. 1-8, 127-137, 146-148, 189-190, 253.
PTAB Case IPR2014-00042, Deposition Transcript of Paul Phillips, dated Jul. 31, 2014.
Davids, Kenneth. Coffee: A Guide to Buying, Brewing, and Enjoying. New York: St. Martin's Griffin, 2001; pp. 160-164.
PTAB Case IPR2014-00042, Declaration of Alexander Slocum in Support of Opposition to Patent Owner's Motion to Amend, dated Aug. 13, 2014.
PTAB Case IPR2014-00042, Declaration of Alexander Slocum in Support of Petitioner's Reply to Patent Owner's Response, dated Aug. 13, 2014.
PTAB Case IPR2014-00042, Petitioner's Oral Hearing Demonstratives, Date: Sep. 3, 2014.
PTAB Case IPR2014-00042, Teleconference Transcript, dated Oct. 27, 2014.
PTAB Case IPR2014-00042, Teleconference Transcript, dated Nov. 13, 2014.
PTAB Case IPR2014-00042, Declaration of Paul Phillips in Support of Patent Owner's Response to the Petition and Patent Owner's Motion to Amend, Date:Sep. 3, 2014.
PTAB Case IPR2014-00042, Sep. 3, 2014 deposition transcript of Dr. Alexander H. Slocum, Date:Sep. 3, 2014.
PTAB Case IPR2014-00042, Declaration of Paul Phillips in Support of Patent Owner's Reply in Support of Motion to Amend, Date:2014.
PTAB Case IPR2014-00042, Patent Owner's Demonstrative Exhibits, Date:2014.
USCAFC 2015-1683 Judgement, Apr. 8, 2016.

(56) References Cited

OTHER PUBLICATIONS

United States District Court Western District of Washington Case No. C15-0522RSL, Order Construing Claims, Feb. 24, 2016.
United States District Court Western District of Washington Case No. C15-0522RSL, Order Granting in Part Plaintiff's Motion for Summary Judgment, Aug. 17, 2016.
United States District Court Western District of Washington Case No. C15-0522RSL, Special Verdict Form, Jun. 8, 2018.
United States District Court Western District of Washington Case No. C15-0522RSL, Order on Obviousness Regarding Claims 5, 8, 18, and 19 of U.S. Pat. No. 8,720,320, Jun. 14, 2018.
United States District Court Western District of Washington Case No. C15-0522RSL, Judgment in a Civil Case, Jun. 14, 2018.
United States District Court Western District of Washington Case No. C15-0522RSL, Judgment in a Civil Case, Jul. 13, 2018.
amazon.com advertisement, Keurig My K-Cup Reusable Coffee Filter—Old Model, Jan. 15, 2006, https://www.amazon.com/Keurig-5048-Reusable-Coffee-Filter/dp/B000DLB2FI/ref=asc_df_B000DLB2FI/?tag=hyprod-20&linkCode=df0&hvadid=167154327488&hvpos=&hvnetw=g&hvrand=7305666241200739661&hvpone=&hvptwo=&hvqmt=&hvdev=c&hvdvcmdl=&hvlocint=&hvlocphy=9012305&hvtargid=pla-305740401970&psc=1.
CAFC 2018-2215, 2018-2254, Decision, Jan. 13, 2020.
CAFC 2018-2215, 2018-2254, Judgement, Jan. 13, 2020.
United States District Court Central District of California, LA CV16-04676 JAK (Lead Case),, Order Re Summary Judgment, Jul. 7, 2017.
United States District Court Central District of California, LA CV16-04676 JAK (Lead Case), Order Re Claim Construction, Jul. 13, 2017.
United States District Court Central District of California, LA CV16-04676 JAK (Lead Case), Joint Status Report on the Issue of Priority Date, Jul. 9, 2019.
United States District Court Central District of California, LA CV16-04676 JAK (Lead Case), Order Granting Plaintiff's Ex Parte Application for Reconsideration Regarding Priority Date Dispute, Jul. 8, 2019.
United States District Court Central District of California, LA CV16-04676 JAK (Lead Case), Judgment, Apr. 15, 2020.
United States International Trade Commission, Investigation No. 337-TA-929, Initial Determination on Violation of Section 337 and Recommended Determination on Remedy and Bond, Sep. 4, 2015.
United States International Trade Commission, Investigation No. 337-TA-929, Commission Opinion, Apr. 6, 2016.
United States International Trade Commission, Investigation No. 337-TA-929, Commission Opinion, Apr. 4, 2017.
United States International Trade Commission, Investigation No. 337-TA-929, Commission Opinion, Aug. 15, 2017.
United States International Trade Commission, Investigation No. 337-TA-929, Notice of Prior Art by Respondents Solofill, LLC, and Dongguan Hai Rui Precision Mould Co., Ltd., Feb. 4, 2015.
United States International Trade Commission, Investigation No. 337-TA-929, Respondent amazon.com, Inc.'s Notice of Prior Art, Feb. 4, 2015.
United States International Trade Commission, Investigation No. 337-TA-929, Respondents' Amended Final Exhibit Lists, Jul. 23, 2015.
United States International Trade Commission, Investigation No. 337-TA-929, Respondents' Final Exhibit List, Date:2015.
CAFC 2016-1841, Decision, May 23, 2017.
Keurig® My K-Cup® Reusable Coffee Filter, https://www.keurig.com/My-K-Cup%C2%AE-Reusable-Coffee-Filter/p/My-K-Cup-Universal-Reusable-Coffee-Filter# Date:2024.
My-Kap lid for K-Cup, https://www.amazon.com/My-Kap-Kaps-K-Cups-Brush-2-45-Ounce/dp/B007614OGK/ref=cm_cr_arp_d_product_top?ie=UTF8, Date:2024.
Perfect Pod EZ-Cup, https://www.perfectpod.com/products/ez-cup-2, Date:2024.

\* cited by examiner

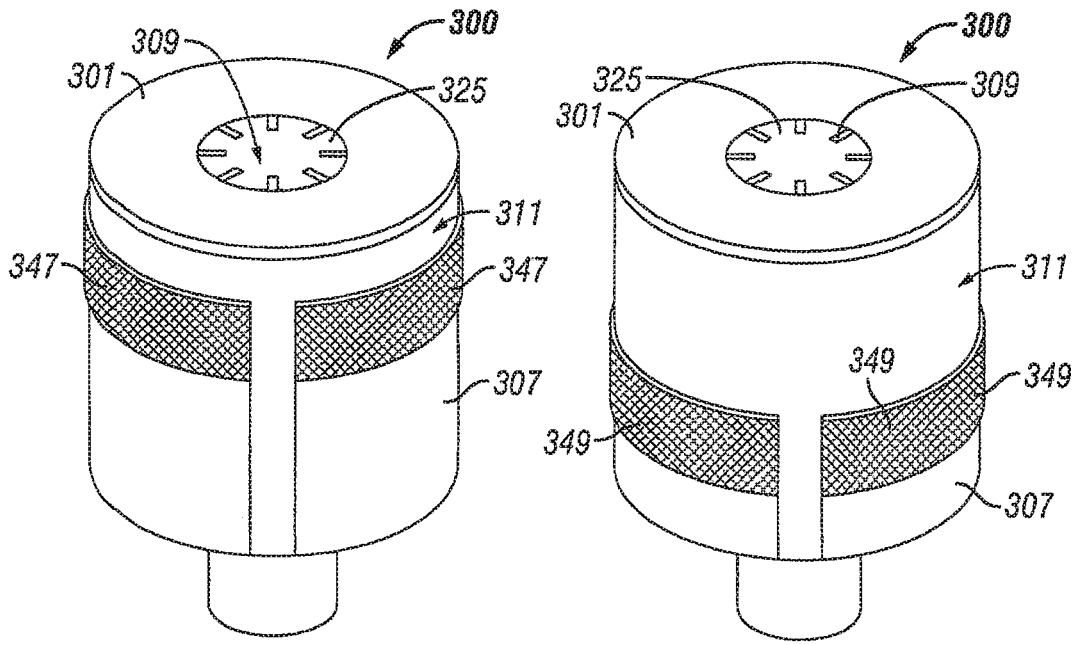
FIG. 8
FIG. 9
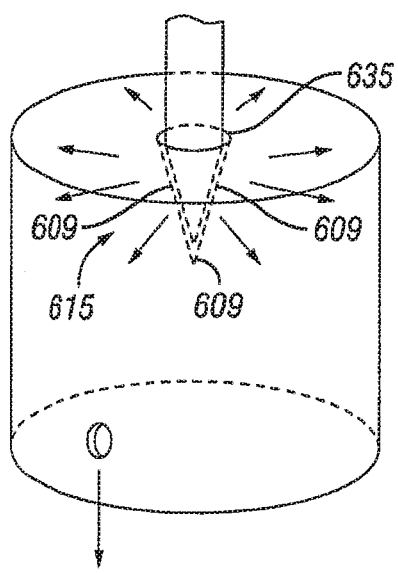
FIG. 10
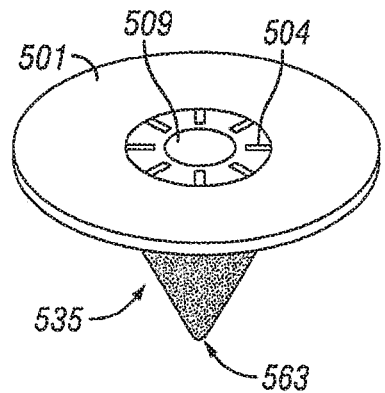
FIG. 11A

APPARATUS AND PRODUCTS FOR PRODUCING BEVERAGES, AND METHODS FOR MAKING AND USING SAME

RELATED APPLICATION DATA

This application is a continuation of U.S. patent application Ser. No. 16/127,186, filed Sep. 10, 2018, issued as U.S. Pat. No. 10,252,854 on Apr. 9, 2019, which is a continuation of U.S. patent application Ser. No. 13/181,478, filed Jul. 12, 2011, issued as U.S. Pat. No. 10,071,851 on Sep. 11, 2018, which claims priority from U.S. Provisional Patent Application No. 61/399,382, filed Jul. 12, 2010, with all applications hereby incorporated by reference.

BACKGROUND OF THE INVENTION

1. Field of the Invention

The present invention relates to apparatus and products for making consumable liquids, and methods of making and using such apparatus, products and liquids. In another aspect, the present invention relates to apparatus and products for brewing such consumable liquids, and methods of making and using such apparatus, products and consumable liquids. In even another aspect, the present invention relates to apparatus and products for brewing such consumable liquids by contacting a heated liquid with solid, semi-solid, syrup or gel material, and methods of making and using such apparatus, products and consumable liquids. In still another aspect, the present invention relates to apparatus and products for brewing consumable liquids such as coffee, tea, cocoa, chocolate, herbal drinks, bullion, consume, medicinal drinks, vitamin drinks, supplement drinks, dehydrated drinks, and methods of making and using such apparatus, products and beverages. In yet another aspect, the present invention relates to reusable apparatus and products for brewing consumable liquids, and methods of making and using such apparatus. In even still another aspect, the present invention relates to reusable apparatus and methods, that may be loaded/reloaded with solids, semi-solids, syrups, and gels, for brewing consumable liquids, and methods of making and using such apparatus. In even yet another aspect, the present invention relates to reusable apparatus and methods, that may be loaded/reloaded with coffee, tea, cocoa, chocolate, herbs, spices, inhalant, seeds, berries, nuts, beans, hulls, shells, husks, vegetable matter, leaves, roots, bullion, consume, medicine, vitamins, supplements, drink powder, for brewing consumable liquids, and methods of making and using such apparatus.

2. Brief Description of the Related Art

In the making of coffee, heated water is contacted with ground coffee to form a coffee beverage which may be consumed hot or cold.

As coffee is quite a historic drink, there is also a long history of development of various apparatus and methods for preparing coffee. Drip brewing is a method for brewing coffee which involves passing water over roasted, ground coffee beans contained in a filter. The water is generally gravity feed through the coffee, absorbing its oils and essences, and then on through the bottom of the filter. The used coffee grounds are retained in the filter with the liquid falling (dripping) into a collecting vessel such as a carafe or pot.

Very commonly, paper filters are commonly used for drip brew all over the world. For ease of operation, the used grounds and the filter are generally disposed of together, without a need to clean the filter, or with very little cleaning required. It is also common to see metal filter that are made of thin perforated metal sheets that restrain the grounds but allow the coffee to pass, thus eliminating the need to have to purchase separate filters. Additionally, many machines now use permanent plastic filters, which are made of a fine mesh.

There also exist small, portable, single serving drip brew makers that only hold the filter and rest on top of a cup. Hot water is poured in and drips directly into the cup.

A very popular item is the single-serving unit containing sufficient ground coffee, tea or other beverage material to produce a single cup of the contained beverage. In operation, this single-serving unit is inserted into a machine, with a cup placed under a discharge spout, and within a short period of time, the beverage is ready.

This type of single serving brewing machine operates by piercing the seal on top of the single serving container with a spray nozzle, while simultaneously piercing the bottom of the container with a discharge nozzle. The coffee grounds sit on a filter within the container, which filter is not punctured. The spray nozzle introduces water into the container, with the water passing through the grounds and through the filter into the waiting cup.

There are a number of patents that relate making coffee, specifically to beverage cartridges, the following of which are merely a small sampling.

U.S. Pat. No. D637,484, issued May 10, 2011, to Winkler, discloses an ornamental design for a beverage cartridge, as shown and described.

U.S. Pat. No. D502,362, issued on Mar. 1, 2005, to Lazaris et al, discloses an ornamental design for a disposable beverage filter cartridge, as shown and described.

U.S. Pat. No. 6,708,600, issued on Mar. 23, 2004, to Winkler et al, discloses the puncturing and venting of single serve beverage filter cartridge. A liquid inlet probe for piercing the lid of a beverage filter cartridge comprises a cylindrical inner hub surrounded by an enlarged diameter outer sleeve. Support ribs extend radially between and coact with the exterior of the hub and the interior of the sleeve to define a plurality of liquid supply passages. The hub, ribs and sleeve having bevelled lower ends arranged in a truncated conical alignment converging towards the center of the probe to a pointed end projecting downwardly from its lower end.

U.S. Pat. No. 6,658,989, issued on Dec. 9, 2003, to Sweeney et al, discloses are-usable beverage filter cartridge for use in a single serve beverage brewer in which a measured charge of a dry beverage medium is infused with a metered amount of heated liquid to produce a beverage medium. The reusable beverage filter cartridge is provided for containing the beverage medium and for accommodating an inflow of the heated liquid and an outflow of the beverage medium. The cartridge comprises a cup-shaped housing having a top opening and a closed bottom with an outlet port. A filter internally subdivides the housing into a first chamber accessible via the top opening and configured and dimensioned to contain the beverage medium, and a second chamber communicating with the outlet port. A lid is removably secured to the housing in a position closing the top opening, and an inlet port in the lid serves to admit heated liquid into the first chamber for infusion with the beverage medium contained therein. The filter is permeable to accommodate a flow therethrough of the resulting beverage into the second chamber from which it exits via the outlet port.

U.S. Pat. No. 6,645,537, issued on Nov. 11, 2003, to Sweeney et al, discloses a beverage filter cartridge that includes a cup-shaped outer container with a bottom and a side wall extending upwardly from the bottom wall to a circular rim surrounding an upper opening. The side wall has an upper section extending downwardly from the rim to an intermediate section, and a tapered lower section configured to provide a plurality of circumferentially spaced flutes extending downwardly from the intermediate section to the bottom wall. A filter element subdivides the interior of the container into first and second chambers. A beverage medium is stored in the first chamber. A cover is joined to the side wall at the rim to close the upper opening. The cover is yieldably pierceable to accommodate an injection of liquid into the first chamber for combination with the beverage medium to produce a beverage. The filter element is permeable to accommodate a flow of the beverage from the first chamber into the second chamber, and the bottom wall is yieldably pierceable to accommodate an outflow of the beverage from the second chamber to the exterior of the cartridge.

U.S. Pat. No. 6,607,762, issued on Aug. 19, 2003 and U.S. Pat. No. 6,589,577, issued on Jul. 8, 2003, to Lazaris et al, both disclose a disposable single serve beverage filter cartridge comprising an outer container with an access opening. A filter element is received in and configured and arranged to subdivide the interior of the container into first and second chambers. A beverage medium is stored in the first chamber. A lid closes the access opening. The lid has a first section overlying the first chamber and a second section overlying the second chamber. The first section of the lid is yieldably pierceable to accommodate an inflow of liquid into the first chamber for infusion with the beverage medium to produce a beverage. The filter element is permeable to accommodate a flow of the beverage from the first chamber into the second chamber, and the second section of the lid is yieldably pierceable to accommodate an outflow of the beverage from the second chamber to the exterior of the cartridge.

U.S. Pat. No. 6,606,938, issued on Aug. 19, 2003, to Taylor, discloses a two step puncturing and venting of single serve filter cartridge in a beverage brewer. In a method and apparatus for brewing a beverage from a dry beverage medium contained in a disposable cartridge, the cartridge is initially pierced and vented by a tubular outlet probe, and then pierced by a tubular inlet probe. Heated liquid is admitted to the cartridge interior via the inlet probe for combination with the beverage medium to produce a beverage, and the beverage is extracted from the cartridge via the outlet probe.

U.S. Pat. No. 5,840,189, issued on Nov. 24, 1998, to Sylvan et al, discloses a beverage filter cartridge that includes an impermeable yieldably pierceable base having a predetermined shape and an access opening at one end. A self-supporting wettable filter element is disposed in the base and is permanently sealed to an interior surface of the base. The filter element subdivides the base into first and second chambers, a first chamber for storing an extract of the beverage to be made, and a second empty chamber for accessing the beverage after the beverage outflow from the filter has been made by combining a liquid with the extract. An impermeable, yieldably pierceable, imperforate cover is sealingly engaged with the top of the base to form an impermeable cartridge.

U.S. Pat. No. 5,325,765, issued on Jul. 5, 1994, to Sylvan et al, discloses a beverage filter cartridge that includes an impermeable pierceable base having a predetermined shape and an opening at one end; a self-supporting wettable filter element disposed in the base sealingly engages with the opening in the base and has a form different and smaller than the predetermined shape of the base so that the filter element diverges from the base and divides the base into two sealed chambers, a first chamber for storing an extract of the beverage to be made, and a second empty chamber for accessing the beverage after the beverage outflow from the filter has been made by combining a liquid with the extract; and an impermeable pierceable cover sealingly engaged with the opening in the base to form an impermeable cartridge.

Other coffee related patents include:

U.S. Pat. No. 7,640,845, issued Jan. 5, 2010, Woodnorth, et al., discloses a drain for beverage forming machine.

U.S. Pat. No. 7,523,695, issued Apr. 28, 2009, to Streeter et al, discloses a system for dispensing metered volumes of heated water to the brew chamber of a single serve beverage brewer.

U.S. Pat. No. 7,513,192, issued Apr. 7, 2009, to Sullivan et al, discloses a beverage forming device with opening/closing mechanism for a beverage cartridge receiver U.S. Pat. No. 7,398,726, issued on Jul. 15, 2008, to Streeter et al, discloses a system for dispensing metered volumes of heated water to the brew chamber of a single serve beverage brewer.

U.S. Pat. No. 7,377,162, issued on May 27, 2008, to Lazaris, discloses a method and apparatus for liquid level sensing.

U.S. Pat. No. 7,360,418, issued on Apr. 22, 2008, to Pelovitz, discloses a method and apparatus for sensing liquid level using baseline characteristic.

U.S. Pat. No. 7,347,138, issued on Mar. 25, 2008, to Bragg et al, discloses a brew chamber for a single serve beverage brewer.

U.S. Pat. No. D544,299, issued on Jun. 12, 2007, to Schaffeld et al, discloses an ornamental design for coffee brewer, as shown and described.

U.S. Pat. No. 7,165,488, issued on Jan. 23, 2007, to Bragg et al, discloses a brew chamber for a single serve beverage brewer.

U.S. Pat. No. D513,572, issued on Jan. 17, 2006, to Schaffeld et al, discloses an ornamental design for a coffee brewer, as shown and described.

U.S. Pat. No. D489,215, issued on May 4, 2004, to Honan et al, discloses a coffee brewer. The ornamental design for a coffee brewer, as shown and described.

U.S. Pat. No. 6,672,200, issued on Jan. 6, 2004, to Duffy et al, discloses a system for monitoring and controlling the operation of a single serve beverage brewer.

U.S. Pat. No. 6,666,130, issued on Dec. 23, 2003, to Taylor et al, discloses a baffle operated liquid heating and dispensing system for a single serve beverage brewer.

U.S. Pat. No. 6,655,260, issued on Dec. 2, 2003, to Lazaris et al, discloses a beverage filter cartridge holder.

U.S. Pat. No. D474,111, issued on May 6, 2003, to Lazaris, discloses an ornamental design for a cup shaped container, as shown and described.

U.S. Pat. No. D474,110, issued on May 6, 2003, to Sweeney, discloses an ornamental design for a cup shaped container, as shown and described.

U.S. Pat. No. D462,865, issued on Sep. 17, 2002, to Honan et al, discloses an ornamental design for a coffee brewer, as shown and described.

U.S. Pat. No. 6,440,256, issued on Aug. 27, 2002, to Gordon et al, discloses a method of forming and inserting filter elements in cup-shaped containers.

U.S. Pat. No. D452,434, issued on Dec. 25, 2001, to Sweeney, discloses an ornamental design for a cup shaped container, as shown and described.

U.S. Pat. No. D452,433, issued on Dec. 25, 2001, to Lazaris, discloses an ornamental design for a cup shaped container, as shown and described.

U.S. Pat. No. 6,182,554, issued on Feb. 6, 2001, to Beaulieu et al, discloses a beverage filter cartridge holder.

U.S. Pat. No. 6,142,063, issued on Nov. 7, 2000, to Beaulieu, discloses a automated beverage brewing system.

U.S. Pat. No. 6,082,247, issued on Jul. 4, 2000, to Beaulieu, discloses an apparatus for consecutively dispensing an equal volume of liquid.

U.S. Pat. No. 6,079,315, issued on Jun. 27, 2000, to Beaulieu et al, discloses a beverage filter cartridge holder.

U.S. Pat. No. D408,679, issued on Apr. 27, 1999, to Potts et al, discloses an ornamental design for a coffee brewer, as shown and described.

However, in spite of the above advancements, there exists a need in the beverage brewing art for products, apparatus and methods for brewing coffee and other consumable liquids.

There also exists a need in the beverage brewing art for reusable products, apparatus and methods for brewing coffee and other consumable liquids.

There even also exists a need in the beverage brewing art for products, apparatus and methods for more efficiently brewing coffee and other consumable liquids.

These and other needs in the art will become apparent to those of skill in the art upon review of this specification, including its drawings and claims.

SUMMARY OF THE INVENTION

It is an object of the present invention to provide for products, apparatus and methods for brewing coffee and other consumable liquids.

It is another object of the present invention, to provide for reusable products, apparatus and methods for brewing coffee and other consumable liquids.

It is even another object of the present invention, to provide for products, apparatus and methods for more efficiently brewing coffee and other consumable liquids.

These and other needs in the art will become apparent to those of skill in the art upon review of this specification, including its drawings and claims.

These and other objects of the present invention will become apparent to those of skill in the art upon review of this specification, including its drawings and claims.

According to one embodiment of the present invention there is provided an extractable material container for use in a brewing machine having a water injector. The container may include a liquid impermeable housing defining a reservoir having a vertical axis and comprising a first housing portion and a second housing portion, wherein the first housing portion defines an liquid entry port into the reservoir said entry port adapted for engagement with the water injector, said entry port comprising outlets to direct any liquid entering the reservoir toward at least 3 directions away from the vertical axis, and wherein the second housing portion defines a liquid exit from the reservoir; and, may include a liquid filter positioned in the reservoir to filter any liquid prior to it exiting from the liquid exit.

According to another embodiment of the present invention, there is provided an extractable material container for use in a brewing machine having a water injector. The container may include a liquid impermeable housing defining a reservoir having a vertical axis, said reservoir defined by a first portion of the housing and a second portion of the housing, wherein the first portion of the housing defines an liquid entry port into the reservoir, said entry port directs any liquid entering the reservoir toward at least 3 directions away from the vertical axis, and wherein the second housing portion comprises a liquid permeable filter section which both defines a liquid exit from the reservoir and filters extractable material.

According to even another embodiment of the present invention, there is provided an extractable material container for use in a brewing machine having a water injector. The container, a liquid impermeable housing comprising a top, bottom and side wall connecting the top and bottom, said housing defining a reservoir having a vertical axis, wherein the housing defines an liquid entry port into the reservoir said entry port adapted for engagement with the water injector, said entry port comprising outlets to direct any liquid entering the reservoir toward at least 3 directions away from the vertical axis, and the side wall defining a liquid exit from the reservoir; and, a liquid filter positioned in the reservoir to filter any liquid prior to it exiting from the liquid exit.

According to still another embodiment of the present invention, there is provided a beverage brewing apparatus. The apparatus may include a liquid impermeable housing having a first component defining a brewing chamber having a vertical axis with an access opening, and a second component which may be opened to afford access to said brewing chamber via said access opening, and which may be closed to coact in sealing engagement with said first component to close said access opening. The apparatus may also include a cartridge removably received in said brewing chamber via said access opening, said cartridge comprising an extractable material contained therein. The apparatus may also include a liquid inlet conduit extending through said housing and into said brewing chamber and into liquid communication with the extractable material in said cartridge, wherein said liquid inlet conduit disperses any liquid into the cartridge in at least 3 directions away from the vertical axis.

According to yet another embodiment of the present invention, there is provided a brewing machine for brewing an extractable material contained within a removable cartridge having a vertical axis and loaded into the machine, which then introduces liquid into the cartridge, an improvement comprises dispersing the liquid into the cartridge in at least 3 directions away from the vertical axis.

Various sub-embodiments of all of the above embodiments, may include one or more of wherein at least a portion of the first housing portion is removable from the housing to allow access to the reservoir; wherein at least a portion of the first housing is hingeably moveable to allow access to the reservoir; wherein the liquid entry port directs liquid entering the reservoir in at least 4 directions away from the vertical axis; wherein the liquid entry port directs liquid entering the reservoir in at least 8 directions away from the vertical axis; further comprising extractable material positioned in the reservoir; and/or further comprising coffee, tea or herbal materials positioned in the reservoir.

According to even still another embodiment of the present invention, there is provided a method of brewing an extractable material contained within a removable cartridge having a vertical axis and positioned within a brewing machine, the method may include introducing liquid into the cartridge in at least 3 directions away from the vertical axis. In sub-embodiments of this method embodiment, the method may comprise introducing liquid into the cartridge in at least 4 directions, may comprise removing liquid from a side of the cartridge, may comprise removing liquid from both a side and a bottom of the cartridge, and/or may comprise introducing liquid into the cartridge in at least 4 directions.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

FIG. 8 and FIG. 9 both show a schematic representation of non-limiting embodiments of a single serving cup 300 of the present invention, showing lid 301, hot water distribution outlet 325, distribution outlets 309, cup walls 311 which define a smaller steep zone in FIG. 8 and a larger steep zone in FIG. 9, and filter screen 307 defining a larger filer zone in FIG. 8 and a smaller filter zone in FIG. 9, FIG. 10 is a schematic representation of a distributor 635 for a brewing machine that will provide more distribution than the standard distributors found on commercially available machines.

FIGS. 11A-C show a schematic of a lid 501 for and a method of modifying a commercially available single serving cup 580.

DETAILED DESCRIPTION OF THE INVENTION

In one aspect, the present invention may provide a reusable single serving consumable liquid cup. The cup may be designed to provide a single serving of a consumable liquid.

In another aspect, the present invention may provide a brewing system which includes a brewing machine into which the reusable single serving consumable liquid cup is placed.

In another aspect, the present invention may provide a brewing system which includes a brewing machine which utilizes any suitable single serving consumable liquid, and that further comprises a distribution system that distributes introduced liquid in many directions.

In another aspect, the present invention may provide a method of brewing consumable liquids, and may include the step of unloading the reusable single serving cup of brewing material which is generally an extractable beverage, and/or reloading the reusable single serving cup with brewing material, and/or the step of distributing heated liquid throughout the cup, and/or draining the heated liquid from a plurality of locations from the bottom and/or side of the cup.

Non-limiting examples of brewing materials which may be utilized in consumable liquids which may be prepared by the present invention include coffee, tea, cocoa, chocolate, herbs, seeds, berries, nuts, beans, hulls, shells, husks, vegetable matter, leaves, roots, bullion, consume, medicine, vitamins, supplements, and drink powder.

Non-limiting examples of consumable liquids which may be prepared with the methods, apparatus and products of the present invention, include coffee, tea, cocoa, chocolate, herbal drinks, and drinks from berries, seeds, nuts, beans, hulls, shells, husks, vegetable matter, leaves, roots, bullion, consume, medicine, vitamins, supplements, drink powder, and the like.

Non-limiting examples of products of the present invention, include single serving cups loaded with brewing material such as coffee, tea, cocoa, chocolate, herbs, seeds, berries, nuts, beans, hulls, shells, husks, vegetable matter, leaves, roots, bullion, consume, medicine, vitamins, supplements, and drink powder.

Figure 1:
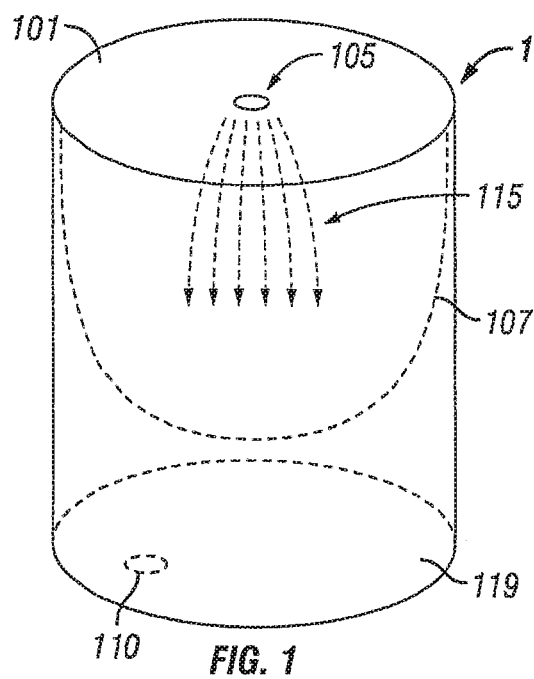
FIG. 1 is a schematic representation of prior art disposable single use cup 100, that includes a top seal layer 101 showing entry puncture 105 made by the water nozzle where hot water enters and exit puncture 110 where brewed coffee exits, with ground coffee is contained within filter 107.

Attention is now directed to FIG. 1 which is a schematic representation of prior art disposable single use cup 100. This cup 100 includes a top seal layer 101 showing entry puncture 105 made by the water nozzle where hot water enters and exit puncture 110 where brewed coffee exits. Exit puncture 110 is shown offset from center as occurs with most commercial machines. A brewing material, that is some sort of extractable beverage such as ground coffee, is contained within filter 107. A puncture needle penetrates cup bottom 119 sufficient to form exit puncture 110, but leaving filter 107 intact. Commercial machines tend to introduce the water through entry puncture 105 in a generally downward direction forming a typical water pattern 115 as shown. Cup 100 sidewalls form a barrier around filter 107 forcing water downward. Without being limited by theory, the inventor believes that because of the generally downward introduction of water by the brewing machine nozzle, and the water pattern 115, there tend to be dead zones within the coffee grinds, or at least zones which could steep more, resulting in weak or under-brewed coffee. These commercially available cups are also designed for a single use and are deemed disposable. Refilling these cups is generally unpractical and not done.

Figure 2:
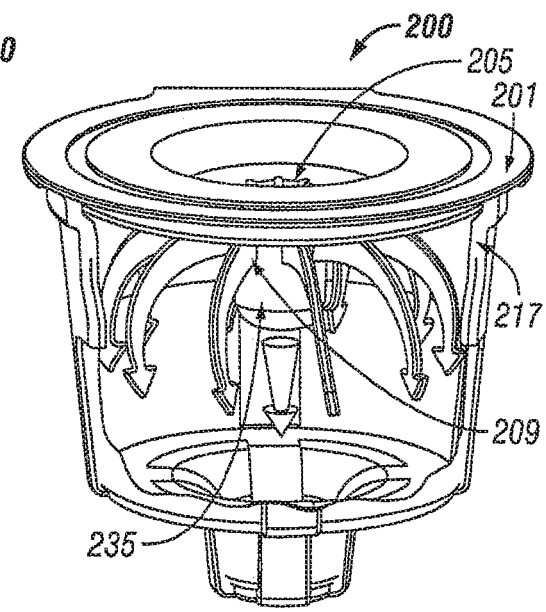
FIG. 2 is a schematic representation of a non-limiting embodiment of a single serving cup 200 of the present invention, showing a liquid distribution outlet 235, which outlet a nozzle receiving interface 205 for receiving the coffee maker nozzle as it penetrates the top seal layer 201, and with distribution outlet 235 including sufficient outlets 209 to direct water not only generally downward, but also away from the vertical axis in at least 2 directions.

Referring additionally to FIG. 2, there is shown a schematic representation of a non-limiting embodiment of a single serving cup of the present invention, showing cup 200 having a liquid distribution outlet 235. This distribution outlet 235 includes a nozzle receiving interface 205 for receiving the coffee maker nozzle as it engages the top seal layer 201. In one non-limiting embodiment, distribution outlet 235 includes sufficient outlets 209 to direct water generally downward and/or away from the vertical axis in at least 2, 3, 4, 5, 6, 7, 8, 9, 10, 11, 12, 13, 14, 15, 16, 17, 18, 19, 20, 50, 75, 100, or more directions. In other non-limiting embodiments, there may be only outlets 209 to direct water away from the vertical axis. The selection of the number of outlets 209 and their direction will generally be selected based on the type of material in the cup, the particle size of the material in the cup, the desired end beverage to be obtained, the steep time, temperature of the water, and/or any other operating factors to be considered by one skilled in brewing the material. It is believed that this distribution nozzle 235 will create a favorable distribution pattern throughout the coffee grinds.

The cross-sectional shape of outlets 209 may be any suitable regular or irregular geometric shape, non-limiting examples of which include triangular, circular, oval, square, rectangular, 3, 4, 5, 6, 7, 8, 9, 10, 11, 12 or more -sided regular or irregular polygon. Outlets 209 may be of the same shape and size, or may be of different shapes and sizes.

Figure 3:
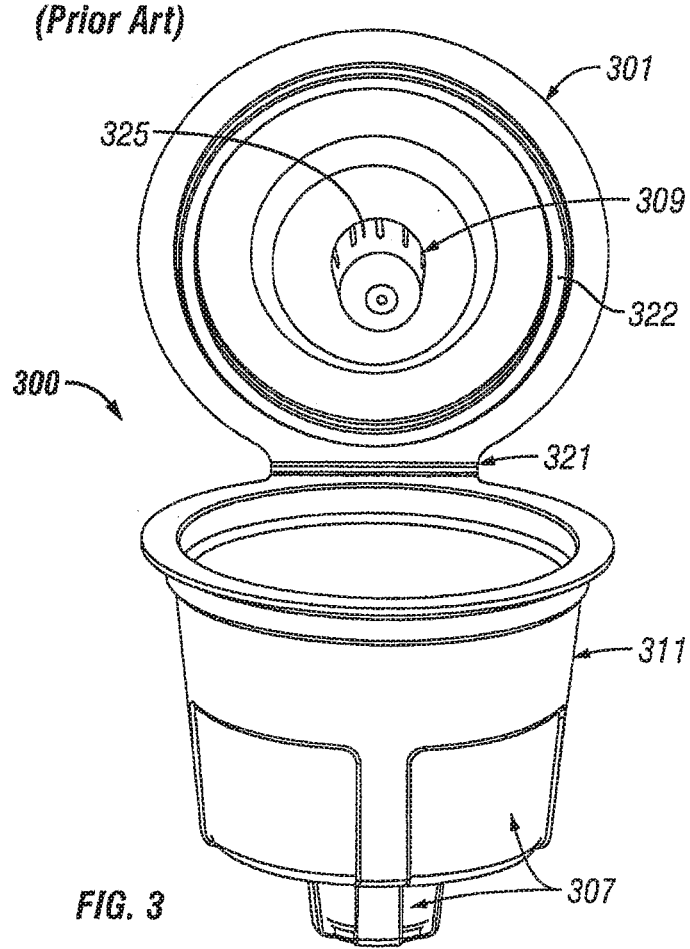
FIG. 3 is a schematic representation of a non-limiting embodiment of a single serving cup 300 of the present invention, showing lid 301, distribution outlet 325, distribution outlets 309, cup walls 311 which define a steep zone, filter screen 307 defining a filter zone, seal 322, and hinge 321.

Referring additionally to FIGS. 3-7, there is shown a non-limiting embodiment of the present invention, a reusable cup 300. As shown in FIG. 3, single serving cup 300 includes lid 301, distribution outlet 325, distribution outlets 309, cup walls 311, filter screen 307, seal 322, and hinge 321. Certainly, lid 301 does not have to be hinged to cup 300, but rather may be fully removable.

In operation, lid 301 which is operable to be opened and closed. That is, lid 301 may be operable in an open position to allow refilling of cup 300, and then operable to reseal cup 300 for brewing.

In the non-limiting embodiment as shown in FIGS. 3-7, this lid 301 is affixed to cup 300 by a hinge 321. Certainly, it should be appreciated, that lid 301 may be operable with cup 300 to be open/closed using any suitable mechanism, including a hinge, locking engagers, interlocking teeth on lid 301 and cup 300, snap fit or friction fit between lid 301 and cup 300, engaging threads on lid 301 and cup 300, external fasteners that hold lid 301 down onto cup 300, and the like. For convenience if lid 301 is not permanently attached to cup 300 (for example by something like hinge 321), it may be tethered to cup 300. As a non-limiting example, should friction fit be utilized, lid 301 may be tethered to cup 300 to prevent its loss or misplacement.

In the non-limiting embodiment of reusable single serving cup 300 as shown, distribution outlet 335 may include sufficient outlets 309 to direct water generally downward, and/or may also include outlets 309 to direct water away from the vertical axis in at least 2, 3, 4, 5, 6, 7, 8, 9, 10, 11, 12, 13, 14, 15, 16, 17, 18, 19, 20, 50, 75, 100 or more directions. The selection of the number of outlets 309 and their direction will generally be selected based on the type of material in the cup, the particle size of the material in the cup, the desired end beverage to be obtained, the steep time, temperature of the water, and/or any other operating factors to be considered by one skilled in brewing the material. It is believed that this distribution nozzle 335 will create a favorable distribution pattern throughout the coffee grinds.

Figure 4:
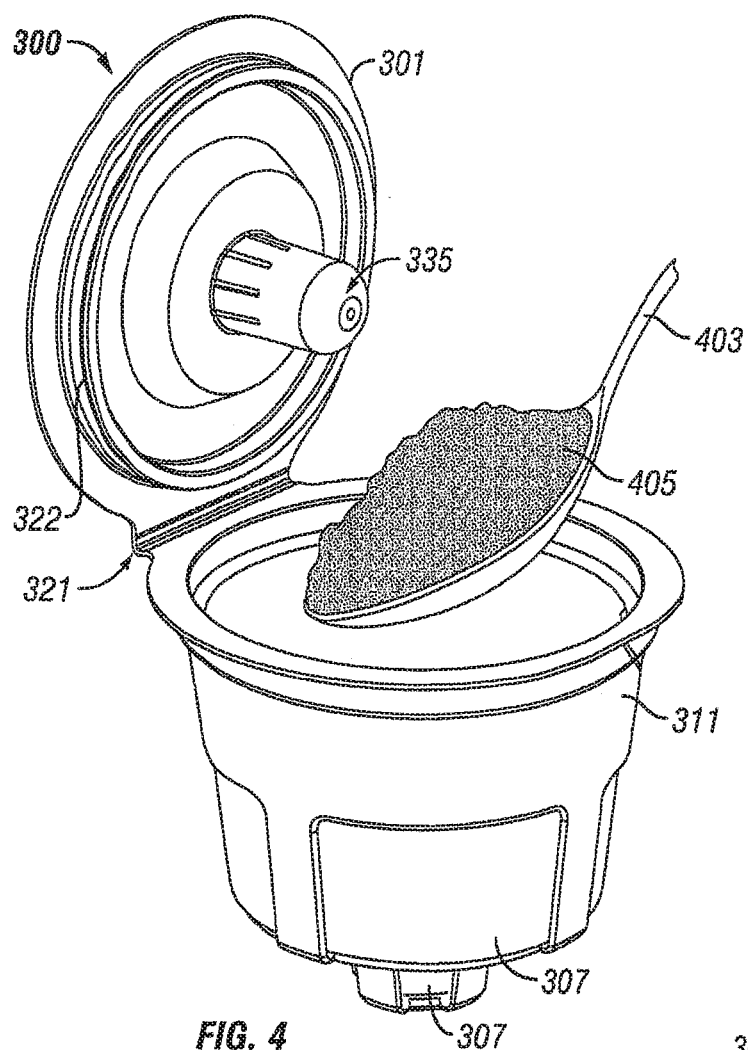
FIG. 4 is a schematic representation showing the refilling of reusable single serving cup 300, with a spoon 403 being used to refill cup 300 with coffee 405.

One non-limiting embodiment of the present invention may include refilling cup 300 as shown in FIG. 4, with a spoon 403 being used to refill cup 300 with coffee 405. Again, it should be understood that any suitable brewing material may be refilled into cup 300.

Figure 5:
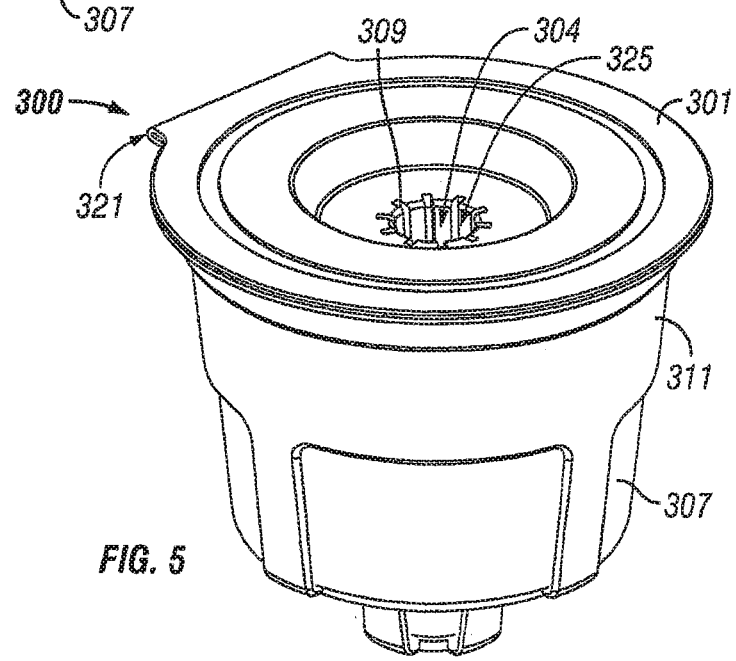
FIG. 5 is a schematic representation showing lid 301 closed reusable cup 300 ready for brewing.

FIG. 5 is a schematic representation showing lid 301 closed and reusable cup 300 ready for brewing.

Figure 6:
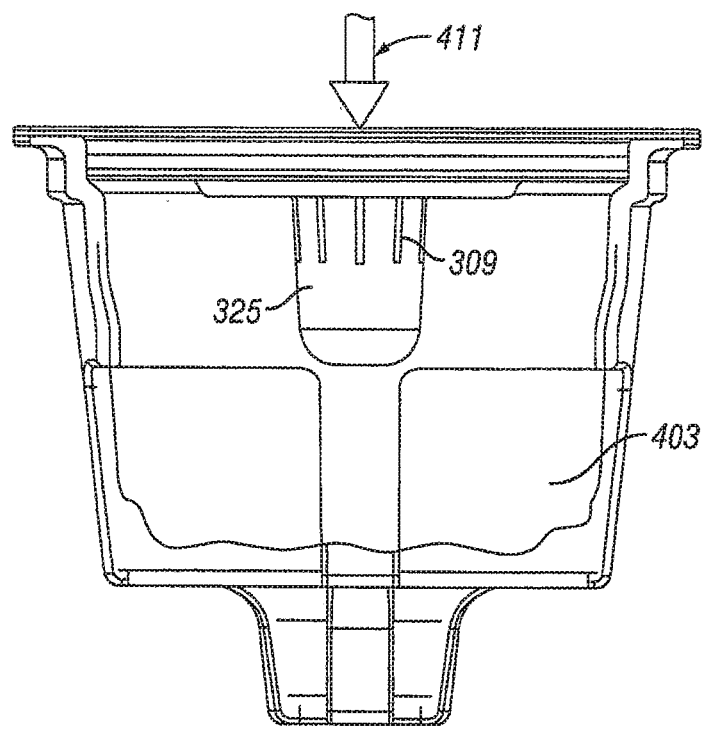
FIG. 6 is a schematic representation showing hot water 411 being introduced to reusable single serving cup 300.

FIG. 6 is a cut-away schematic representation showing hot water 411 being introduced to reusable single serving cup 300 packed with coffee 403.

Figure 7:
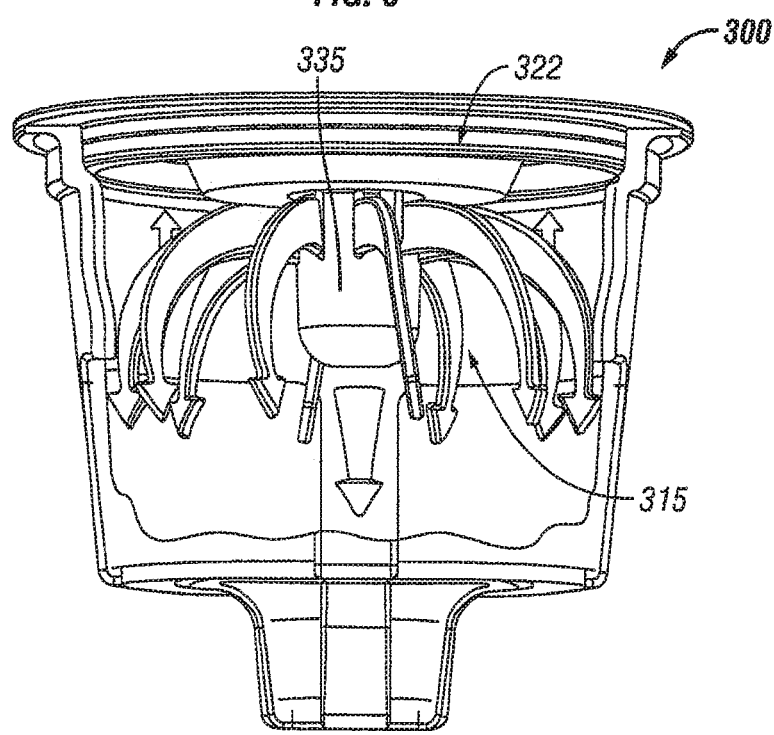
FIG. 7 is a schematic representation showing distribution pattern 315, with water being discharged from distribution outlet 335 in a plurality of directions away from the vertical axis.

FIG. 7 is a cut-away schematic representation showing distribution pattern 315, with water being discharged from distribution outlet 335 in a plurality of directions away from the vertical axis, and downward out of the bottom of distribution outlet 335.

Referring additionally to FIG. 8 and FIG. 9, there are shown other non-limiting embodiments of reusable cup 300. FIG. 8 and FIG. 9 both show a schematic representation of non-limiting embodiments of a single serving cup 300 of the present invention, showing lid 301, hot water distribution outlet 325, distribution outlets 309, cup walls 311 which define a smaller steep zone in FIG. 8 and a larger steep zone in FIG. 9, and filter screen 307 defining a larger filer zone in FIG. 8 and a smaller filter zone in FIG. 9, Specifically, the areas of side walls 311 and the areas of filters 307 vary between FIG. 8 and FIG. 9. As a method of the invention, and for various cup designs, it should be understood, that the ratio of these areas may be varied resulting in more/less steeping of the resultant beverage. In some embodiments, a set of single serving cups are provided having various steep zones and various filter zones. As a non-limiting example, a set of two may be provided with a first single serving cup having a smaller steep zone and a larger filter zone for making rich flavored coffee, and a second single serving cup having a larger steep zone and a smaller filter zone for making bold flavored coffee. With this set of two, a coffee drinker has the choice between making coffee that steeped longer or shorter than the other.

As another non-limiting example, a set of three single serving cups may be provided, with a first single serving cup having a small steep zone and a large filter zone for making rich flavored coffee, a second single serving cup having a medium steep zone and a medium filter zone for making full flavored coffee, and a third single serving cup having a large steep zone and a small filter zone for making bold flavored coffee. It should be understood, that small, medium and large zone sizes are relative between the three single serving cups. With this set of three, a coffee drinker has the choice of making coffee that is steeped to make rich, full (stronger), or bold (strongest).

Certainly, it should be understood that a set may consist of 2, 3, 4, 5, 6, 7, 8, 9, 10 or more cups of various steep and filter zones. In other non-limiting embodiments of the present invention, an apparatus for brewing beverages may include a single serve beverage brewing machine coupled with a set of single serve filter cups.

In even another non-limiting embodiment, a steeping strip 347 as shown in FIG. 8 may be provided that is adapted to be affixed to filter area 307 to decrease the filter zone and increase the steep zone. Likewise, part or all of filter wall 311 may be adapted to be removable, such as portion 349 to increase the filter zone and decrease the steep zone. As a non-limiting example, portion 349 may be perforated to be easily removable. In further non-limiting embodiments, these portions 349 may be re-attachable. Methods including both removing these portions and/or adding these portions, including replacing one size with a different size portion.

Figure 11B:
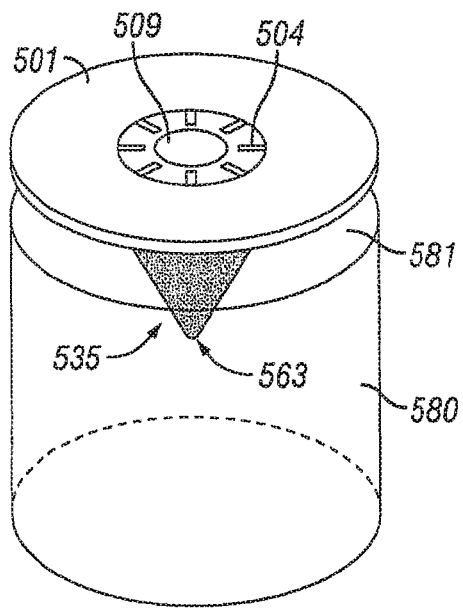
Figure 11C:
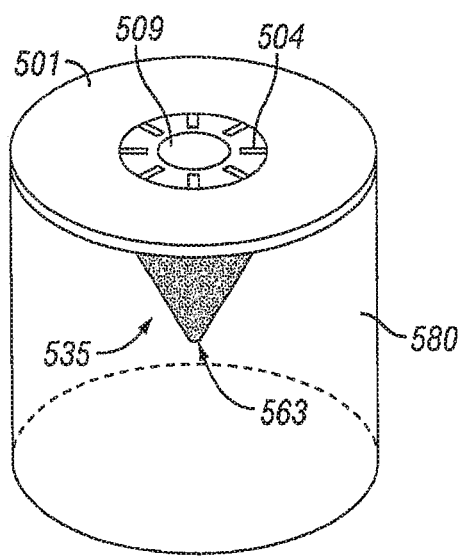

Referring additionally to FIGS. 11A-C there is shown a schematic of a lid 501 for and a method of modifying a commercially available single serving cup 580. Single serving cup modifying lid 501 is shaped and sized to fit onto a commercially available cup 580, and includes distributor 535 having distribution outlets 509 and water inlet 504. Distributor 535 includes a puncture surface 563 adapted to penetrate and puncture membrane seal 581 of cup 580. In operation, a commercially available single serving cup is modified by contacting lid 501 puncture surface 563 with membrane 581 of serving cup 580, and then puncturing membrane 581 as shown in FIG. 11B. Continuing, lid 501 is pressed further against serving cup 580 so that distributor 535 penetrates membrane 581 to the extent that lid 501 now is resting on cup 580 as shown in FIG. 11C. In a further method of making a beverage, this modifying cup 580 is now placed in a brewing machine and the machine operated.

The idea of modifying lid 501 is that distributor 535 will provide more distribution than the distributor of the brewing machine.

Referring additionally to FIG. 10, there is provided a distributor 635 for a brewing machine of the present invention, or for modifying existing brewing machines by substituting this distributor for the existing distributor. This distributor 635 will be affixed to a brewing machine, and will provide more distribution than the standard distributors found on commercially available machines. This distribution outlet 635 may include sufficient outlets 609 to direct water generally downward, and/or may also include outlets 609 to direct water away from the vertical axis in at least 2, 3, 4, 5, 6, 7, 8, 9, 10, 11, 12, 13, 14, 15, 16, 17, 18, 19, 20, or more directions. The selection of the number of outlets 609 and their direction will generally be selected based on the type of material in the cup, the particle size of the material in the cup, the desired end beverage to be obtained, the steep time, temperature of the water, and/or any other operating factors to be considered by one skilled in brewing the material. It is believed that this distribution nozzle 635 will create a favorable distribution pattern 615 throughout the coffee grinds. A further non-limiting embodiment of the present invention will also include a single serving brewing machine having distribution nozzle 635.

Figure 12:
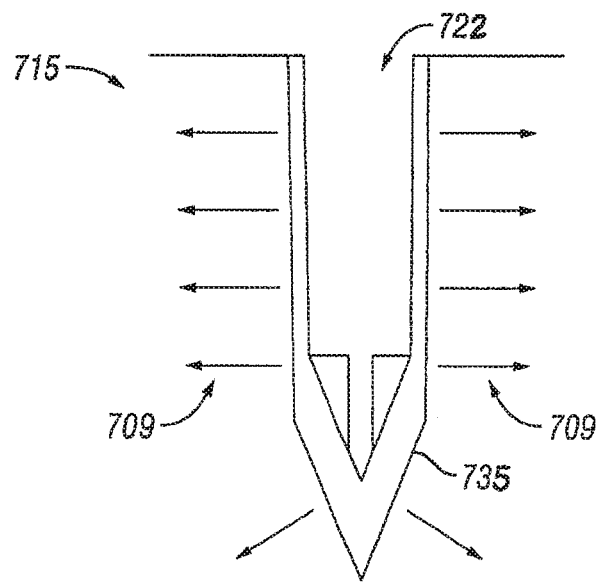
FIG. 12 shows a distribution sleeve 735 having distribution outlets 709, said distribution sleeve 735 is utilized to modify an existing distribution nozzle 722 of a brewing machine.

Referring additionally to FIG. 12, there is shown a distribution sleeve 735 having distribution outlets 709, which may be utilized in methods for modifying existing machines. This distribution sleeve 735 is utilized to modify an existing distribution nozzle 722 of a brewing machine. Distribution sleeve 735 is placed over the existing distribution nozzle 722 and provides a different distribution pattern 715 than the existing nozzle 722. Again, for the typical commercially available brewing machine, the water is distributed in a rather limited pattern. This distributor 735 may include sufficient outlets 709 to direct water generally downward, and/or may also include outlets 709 to direct water away from the vertical axis in at least 2, 3, 4, 5, 6, 7, 8, 9, 10, 11, 12, 13, 14, 15, 16, 17, 18, 19, 20, or more directions.

EXAMPLE

Equal amount of the same type of coffee were utilized in a cup 300 as shown in FIGS. 3-7, and in a commercially available "K" type cup. Each of these cups were inserted into a commercially available "K" type cup machine, using identical settings and coffee brewed. Examination of the two obtained cups of coffee by holding the clear glass cups up to light revealed that coffee brewed using cup 300 of the present invention was significantly darker, which is interpreted as a more complete brewing of the coffee.

All of the patents and applications cited in this specification, are herein incorporated by reference.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

The invention claimed is:

1. A reusable cartridge configured for being enclosed in a brewing machine, said brewing machine having a discharge needle and liquid injector, said reusable cartridge comprising:
   a housing having a liquid impermeable frame defining at least one opening, with a filter material spanning said opening to form a liquid exit, said liquid impermeable frame and said filter material defining a material holding space having an entrance thereto, said housing further defining a discharge needle space configured to receive the discharge needle without the discharge needle piercing the reusable cartridge when the reusable cartridge is enclosed in the brewing machine; and
   a lid operable to seal the entrance is hingedly attached to the housing, said lid operable in an open position to allow access through the entrance to the material holding space, said lid defining a liquid entry port into the material holding space, said liquid entry port comprising a port nozzle extending into said material holding space, said liquid entry port receiving the liquid injector with at least a portion of the liquid injector extending into said port nozzle when said reusable cartridge is enclosed in the brewing machine, said port nozzle brewing machine, said port nozzle injecting liquid from the liquid injector into the material holding space during a brewing cycle.

2. The cartridge of claim 1, wherein the port nozzle includes a plurality of directed outlets.

3. A reusable cartridge configured for being enclosed in a brewing machine, said brewing machine having a discharge needle and liquid injector, said reusable cartridge comprising:
   a housing having a liquid impermeable frame defining a bottom and a side wall extending upward from the bottom, with at least one opening defined in said side wall, with a filter material spanning said opening to form a liquid exit out of the side wall, said liquid impermeable frame and said filter material defining a material holding space having an entrance thereto and having a fill line, said housing further defining a discharge needle space configured to receive the discharge needle without the discharge needle piercing the housing when the reusable cartridge is enclosed in the brewing machine; and
   a lid operable to seal the entrance is hingedly affixed to the housing, said lid operable in an open position to allow access through the entrance to the material holding space, said lid defining a liquid entry port into the material holding space, said liquid entry port comprising a port nozzle extending into said material holding space past the fill line, said liquid entry port receiving the liquid injector with at least a portion of the liquid injector extending into said port nozzle when said reusable cartridge is enclosed in the brewing machine, said port nozzle injecting liquid from the liquid injector below the fill line during a brewing cycle.

4. The cartridge of claim 3, wherein the port nozzle includes a plurality of directed outlets.

5. A reusable cartridge configured for being enclosed in a brewing machine, said brewing machine having a discharge needle and liquid injector, said reusable cartridge comprising:
   a housing having a liquid impermeable frame defining at least one opening, with a filter material spanning said opening to form a liquid exit, said liquid impermeable frame and said filter material defining a material holding space having an entrance thereto, said housing further defining a discharge needle space configured to receive the discharge needle without the discharge needle piercing the reusable cartridge when the reusable cartridge is enclosed in the brewing machine; and
   a lid operable to seal the entrance is hingedly attached to the housing, said lid operable in an open position to allow access through the entrance to the material holding space, said lid defining a liquid entry port into the material holding space, said liquid entry port receiving the liquid injector when said reusable cartridge is enclosed in the brewing machine, liquid injector injecting liquid through the liquid entry port and into the material holding space during a brewing cycle.

6. The cartridge of claim 5, wherein the liquid entry port includes a plurality of directed outlets.

7. The cartridge of claim 5, further comprising a plurality of directed outlets arranged in fluid communication with the liquid entry port.

* * * * *

UNITED STATES PATENT AND TRADEMARK OFFICE
CERTIFICATE OF CORRECTION

| | | |
|---|---|---|
| PATENT NO. | : 12,378,061 B2 | Page 1 of 1 |
| APPLICATION NO. | : 16/378495 | |
| DATED | : August 5, 2025 | |
| INVENTOR(S) | : Robert Bao Vu | |

It is certified that error appears in the above-identified patent and that said Letters Patent is hereby corrected as shown below:

In the Claims

Column 12, Lines 17-42 should read:
The invention claimed is:
1. A reusable cartridge configured for being enclosed in a brewing machine, said brewing machine having a discharge needle and liquid injector, said reusable cartridge comprising:
 a housing having a liquid impermeable frame defining at least one opening, with a filter material spanning said opening to form a liquid exit, said liquid impermeable frame and said filter material defining a material holding space having an entrance thereto, said housing further defining a discharge needle space configured to receive the discharge needle without the discharge needle piercing the reusable cartridge when the reusable cartridge is enclosed in the brewing machine; and
 a lid operable to seal the entrance is hingedly attached to the housing, said lid operable in an open position to allow access through the entrance to the material holding space, said lid defining a liquid entry port into the material holding space, said liquid entry port comprising a port nozzle extending into said material holding space, said liquid entry port receiving the liquid injector with at least a portion of the liquid injector extending into said port nozzle when said reusable cartridge is enclosed in the brewing machine, said port nozzle injecting liquid from the liquid injector into the material holding space during a brewing cycle.

Signed and Sealed this
Twenty-eighth Day of October, 2025

John A. Squires
*Director of the United States Patent and Trademark Office*